US012736888B2

(12) United States Patent
Inoue et al.

(10) Patent No.: US 12,736,888 B2
(45) Date of Patent: Sep. 15, 2026

(54) TONER

(71) Applicant: CANON KABUSHIKI KAISHA, Tokyo (JP)

(72) Inventors: Mayumi Inoue, Kanagawa (JP); Takashi Kenmoku, Shizuoka (JP); Yoshiaki Shiotari, Shizuoka (JP); Shohei Kototani, Shizuoka (JP); Kozue Uratani, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 577 days.

(21) Appl. No.: 18/350,266

(22) Filed: Jul. 11, 2023

(65) Prior Publication Data

US 2024/0019791 A1 Jan. 18, 2024

(30) Foreign Application Priority Data

Jul. 15, 2022 (JP) ................................ 2022-113884

(51) Int. Cl.
*G03G 9/08* (2006.01)
*G03G 9/087* (2006.01)
*G03G 9/093* (2006.01)

(52) U.S. Cl.
CPC ....... *G03G 9/0821* (2013.01); *G03G 9/08711* (2013.01); *G03G 9/08728* (2013.01); *G03G 9/08782* (2013.01); *G03G 9/09328* (2013.01)

(58) Field of Classification Search
CPC ............. G03G 9/0821; G03G 9/08711; G03G 9/08755
See application file for complete search history.

(56) References Cited

U.S. PATENT DOCUMENTS 7,393,912 B2 7/2008 Mihara
7,399,568 B2 7/2008 Fuku
(Continued)

FOREIGN PATENT DOCUMENTS

JP 9-114134 A 5/1997
JP 9-179341 A 7/1997
(Continued)

OTHER PUBLICATIONS

Translation of JP 2008-009211.*
(Continued)

*Primary Examiner* — Peter L Vajda
(74) *Attorney, Agent, or Firm* — VENABLE LLP

(57) ABSTRACT

A toner comprising a toner particle, wherein the toner particle comprises a binder resin and wax, and where with respect to a slope X of a straight line obtained by performing a micro-compression test on the toner, obtaining a relationship of a deformation amount (μm) to a load (mN), calculating a percentage deformation (%), which is a ratio of the deformation amount to a particle diameter of the particle measured, plotting a load (mN)-percentage deformation (%) plot, and then using all the points plotted within the range in which the percentage deformation was 15% or less of the particle diameter of the particle for approximation by a least squares method, the slope X measured at 30° C. is denoted by X30 and the slope X measured at 45° C. is denoted by X45, the X30 is 25 to 300, and the X45 is 400 to 1000.

9 Claims, 3 Drawing Sheets

(56) References Cited

U.S. PATENT DOCUMENTS 7,452,960 B2 11/2008 Yano
7,510,813 B2 3/2009 Yano
7,638,194 B2 12/2009 Fukui
7,638,590 B2 12/2009 Fukui
7,682,765 B2 3/2010 Sugawa
7,795,363 B2 9/2010 Fukui
7,935,771 B2 5/2011 Fukui
8,067,136 B2 11/2011 Yano
8,110,329 B2 2/2012 Tominaga
8,178,271 B2 5/2012 Fukui
8,288,069 B2 10/2012 Fujikawa
8,323,726 B2 12/2012 Naka
8,367,289 B2 2/2013 Isono
8,383,312 B2 2/2013 Fujimoto
8,440,382 B2 5/2013 Isono
8,497,054 B2 7/2013 Sugiyama
8,574,801 B2 11/2013 Itabashi
8,609,312 B2 12/2013 Itabashi
8,652,737 B2 2/2014 Handa
8,778,581 B2 7/2014 Nonaka
8,828,633 B2 9/2014 Itabashi
8,918,035 B2 12/2014 Hasegawa
8,986,914 B2 3/2015 Fujikawa
9,029,056 B2 5/2015 Kenmoku
9,034,549 B2 5/2015 Shiotari
9,098,002 B2 8/2015 Kenmoku
9,098,003 B2 8/2015 Masumoto
9,158,216 B2 10/2015 Shimano
9,244,371 B2 1/2016 Suzumura
9,256,148 B2 2/2016 Fujikawa
9,261,806 B2 2/2016 Moribe
9,285,697 B2 3/2016 Fukudome
9,304,422 B2 4/2016 Matsui
9,348,246 B2 5/2016 Magome
9,354,545 B2 5/2016 Matsui
9,377,705 B2 6/2016 Shimano
9,377,708 B2 6/2016 Magome
9,383,668 B2 7/2016 Noji
9,423,711 B2 8/2016 Uratani
9,423,714 B2 8/2016 Kenmoku
9,442,416 B2 9/2016 Magome
9,500,972 B2 11/2016 Tanaka
9,575,424 B2 2/2017 Nakagawa
9,594,323 B2 3/2017 Fujikawa
9,599,919 B2 3/2017 Isono
9,625,842 B2 4/2017 Uratani
9,658,546 B2 5/2017 Tanaka
9,658,549 B2 5/2017 Tanaka
9,785,071 B2 10/2017 Shimano
9,804,514 B2 10/2017 Suzumura
9,829,816 B2 11/2017 Tanaka
9,835,964 B2 12/2017 Yoshida
9,841,692 B2 12/2017 Hasegawa
9,857,707 B2 1/2018 Tsuda
9,880,478 B2 1/2018 Shimano
9,904,193 B2 2/2018 Nakagawa
9,958,801 B2 5/2018 Tanaka
9,964,874 B2 5/2018 Suzumura
10,054,866 B2 8/2018 Tanaka
10,078,279 B2 9/2018 Nakagawa
10,101,681 B2 10/2018 Tagawa
10,114,303 B2 10/2018 Katsura
10,216,107 B2 2/2019 Tsubaki
10,228,627 B2 3/2019 Nagashima
10,310,397 B2 6/2019 Sano
10,545,420 B2 1/2020 Kinumatsu
10,578,990 B2 3/2020 Tsuda
10,678,155 B2 6/2020 Terui
10,698,327 B2 6/2020 Nagashima
10,747,133 B2 8/2020 Yagi
10,747,136 B2 8/2020 Kenmoku
10,782,623 B2 9/2020 Yoshiba
10,942,465 B2 3/2021 Kototani
10,942,466 B2 3/2021 Tominaga
10,948,839 B2 3/2021 Tsubaki
10,976,678 B2 4/2021 Yamawaki
10,976,679 B2 4/2021 Tanaka
11,003,104 B2 5/2021 Katsura
11,003,105 B2 5/2021 Sato
11,086,242 B2 8/2021 Isono
11,112,708 B2 9/2021 Uratani
11,169,458 B2 11/2021 Toyoizumi
11,169,460 B2 11/2021 Kototani
11,175,600 B2 11/2021 Uchiyama
11,181,845 B2 11/2021 Shimoda
11,249,412 B2 2/2022 Kawamura
11,256,187 B2 2/2022 Ogaki
11,314,178 B2 4/2022 Kenmoku
11,347,157 B2 5/2022 Kamikura
11,397,386 B2 7/2022 Kyuushima
11,531,282 B2 12/2022 Kamikura
11,714,363 B2 8/2023 Ookubo
2012/0328979 A1 12/2012 Yoshizaki
2013/0011774 A1 1/2013 Kamiwaki et al.
2015/0099222 A1 4/2015 Terui
2020/0026208 A1 1/2020 Terui
2020/0124998 A1 4/2020 Kototani
2020/0209771 A1 7/2020 Hashimoto et al.
2020/0292955 A1 9/2020 Matsunaga et al.
2020/0341400 A1 10/2020 Shimoda et al.
2021/0026265 A1 1/2021 Kamikura et al.
2021/0223731 A1 7/2021 Suzuki et al.
2021/0311405 A1 10/2021 Shiotari
2021/0318630 A1 10/2021 Terui
2021/0318631 A1 10/2021 Isono
2022/0075284 A1 3/2022 Nakayama
2022/0128915 A1 4/2022 Toyoda
2022/0128916 A1 4/2022 Yoshida
2022/0128918 A1 4/2022 Kototani
2022/0128919 A1 4/2022 Kawamura
2022/0146952 A1 5/2022 Komiya
2022/0146953 A1 5/2022 Kyuushima
2022/0146954 A1 5/2022 Kato
2022/0146955 A1 5/2022 Nozaki
2022/0206402 A1* 6/2022 Uratani .............. G03G 9/08711
2022/0214629 A1 7/2022 Kenmoku
2022/0214630 A1 7/2022 Kamikura
2022/0390870 A1 12/2022 Kyuushima
2022/0390871 A1 12/2022 Isono
2022/0397836 A1 12/2022 Toyoda
2022/0404730 A1 12/2022 Nagaoka
2022/0413407 A1 12/2022 Inoue
2023/0080900 A1 3/2023 Kamikura
2023/0114583 A1 4/2023 Kenmoku
2023/0116451 A1 4/2023 Uratani
2023/0117448 A1 4/2023 Fukudome
2023/0119795 A1 4/2023 Saeki
2023/0161277 A1 5/2023 Komiya

FOREIGN PATENT DOCUMENTS

JP 2008-009211 * 1/2008 ............. G03G 9/087
JP 2011-227498 A 11/2011
JP 2015-96948 A 5/2015
JP 2019-86641 A 6/2019
JP 2020-12943 A 1/2020
JP 2020-64254 A 4/2020
JP 2020-154292 A 9/2020
JP 2020-181187 A 11/2020
JP 2021-18335 A 2/2021
JP 2021-113861 A 8/2021
JP 2021-167896 A 10/2021
JP 2022-25866 A 2/2022
JP 2022-69321 A 5/2022
JP 2022-92582 A 6/2022

OTHER PUBLICATIONS

U.S. Appl. No. 18/321,312, Keisuke Adachi, filed May 22, 2023.
U.S. Appl. No. 18/327,506, Masaya Komuro, filed Jun. 1, 2023.
U.S. Appl. No. 18/350,248, Yoshiaki Shiotari, filed Jul. 11, 2023.
U.S. Appl. No. 18/350,260, Kenji Ookubo, filed Jul. 11, 2023.
U.S. Appl. No. 18/350,309, Naoya Isono, filed Jul. 11, 2023.

(56) References Cited

OTHER PUBLICATIONS

U.S. Appl. No. 18/350,331, Shohei Kototani, filed Jul. 11, 2023.
U.S. Appl. No. 18/354,776, Shohei Kototani, filed Jul. 19, 2023.
Robert F. Fedors, A Method for Estimating Both the Solubility Parameters and Molar Volumes of Liquids, Polymer Engineering and Science, vol. 14, No. 2, 147-154,1974.

* cited by examiner

TONER

BACKGROUND OF THE INVENTION

Field of the Invention

The present disclosure relates to a toner for developing electrostatic images used in an image forming method such as electrophotography and electrostatic printing.

Description of the Related Art

In recent years, image forming devices such as copiers and printers have diversified in intended use and usage environment, and are required to have higher speed, higher image quality, and higher stability. In order to cope with the increase in printing speed, a toner that can be fixed at high speed is required. In particular, there is a growing demand for energy-saving fixing techniques as a response to global warming issues, and toners are desirable that exhibit high glossiness and rich color reproducibility satisfying high image quality even in a fixing system with a load lighter and a fixing temperature lower than those in the conventional systems.

To achieve this, it is necessary to lower the glass transition point (Tg) of the toner binder and lower the average molecular weight of the toner binder. However, where the Tg or average molecular weight of the toner binder is simply lowered, the storage stability of the toner will be impaired, and a phenomenon such as the occurrence of image streaks due to fusion or adhesion of the toner to a toner layer thickness control member is likely to occur. Such a phenomenon tends to occur particularly in a high-temperature and high-humidity environment.

Various proposals have been made to achieve both the development stability and low-temperature fixability of toners, which seem to contradict each other.

Japanese Patent Application Publication No. 2020-064254 discloses a toner characterized in that in a load-percentage deformation curve obtained by performing a micro-compression test of toner particles under two different temperature conditions, the difference in the increase rate of the percentage deformation at each temperature is within a specific range.

Japanese Patent Application Publication No. 2019-086641 discloses a toner in which a Hansen solubility parameter distance (HSP distance) between some monomer units of a polymer constituting a binder resin and ester wax is reduced.

Japanese Patent Application Publication No. 2011-227498 proposes a toner characterized in that in a load-percentage deformation curve obtained by performing a micro-compression test of toner particles, a rate of change in displacement when micro-compression is performed at 50° C. with respect to the amount of displacement when micro-compression is performed at 25° C. is within a specified range.

Japanese Patent Application Publication No. 2020-012943 proposes a toner in which protrusions are formed on a toner particle surface and the shape of the protrusions is controlled.

SUMMARY OF THE INVENTION

In Japanese Patent Application Publication No. 2020-064254, a toner having the above characteristics is obtained by including an ester wax that is highly compatible with a binder resin and forming an organosilicon polymer on the surface layer. Due to the hard surface layer of the organosilicon polymer, such a toner has high development durability even under high-speed printing. Meanwhile, it was understood that the compatibility between the binder resin and the ester wax is low, the promotion of plasticization of the binder resin is insufficient, and there is room for improvement when the fixing process is performed at a lighter load or increased speed.

Further, the toner as disclosed in Japanese Patent Application Publication No. 2019-086641 is effective for suppressing contamination inside the image forming apparatus, but in order to cope with the lightening of the load and the speeding up of the fixing process, the heat conduction inside the toner is insufficient, and it is necessary to further improve the low-temperature fixing characteristics in a light-load fixing system.

The toner disclosed in Japanese Patent Application Publication No. 2011-227498 can demonstrate satisfactory fixing performance in a normal fixing process, but there is still room for improvement when the fixing process is speeded up.

With the method described in Japanese Patent Application Publication No. 2020-012943, migration, detachment, and embedment of the protrusions can be suppressed and high transferability can be maintained by controlling the shape of the protrusions. However, the toner disclosed in Japanese Patent Application Publication No. 2020-012943 needs to be improved in order to improve low-temperature fixability in a light-load fixing system.

As described above, a toner that achieves both development durability and low-temperature fixability in a light-load fixing system has not been obtained, and further improvement is required.

The present disclosure provides a toner that achieves both development durability under high-temperature and high-humidity conditions and low-temperature fixability needed for adapting to the lightening of the load and the speeding up of the fixing process.

The present disclosure relates to a toner comprising a toner particle, wherein the toner particle comprises a binder resin and wax, and where with respect to a slope X of a straight line obtained by performing a micro-compression test on one particle of the toner, obtaining a relationship of a deformation amount (μm) with respect to a load (mN), calculating a percentage deformation (%), which is a ratio of the deformation amount to a particle diameter of the particle that was measured, plotting a load (mN)-percentage deformation (%) plot, and then using all the points plotted within the range in which the percentage deformation was 15% or less of the particle diameter of the particle that was measured for approximation by a least squares method, the slope X measured at 30° C. is denoted by X30 and the slope X measured at 45° C. is denoted by X45, the X30 is 25 to 300, and the X45 is 400 to 1000.

The present disclosure can provide a toner that achieves both development durability under high-temperature and high-humidity conditions and low-temperature fixability needed for adapting to the lightening of the load and the speeding up of the fixing process. Further features of the present invention will become apparent from the following description of exemplary embodiments with reference to the attached drawings.

DESCRIPTION OF THE EMBODIMENTS

Figure 1:
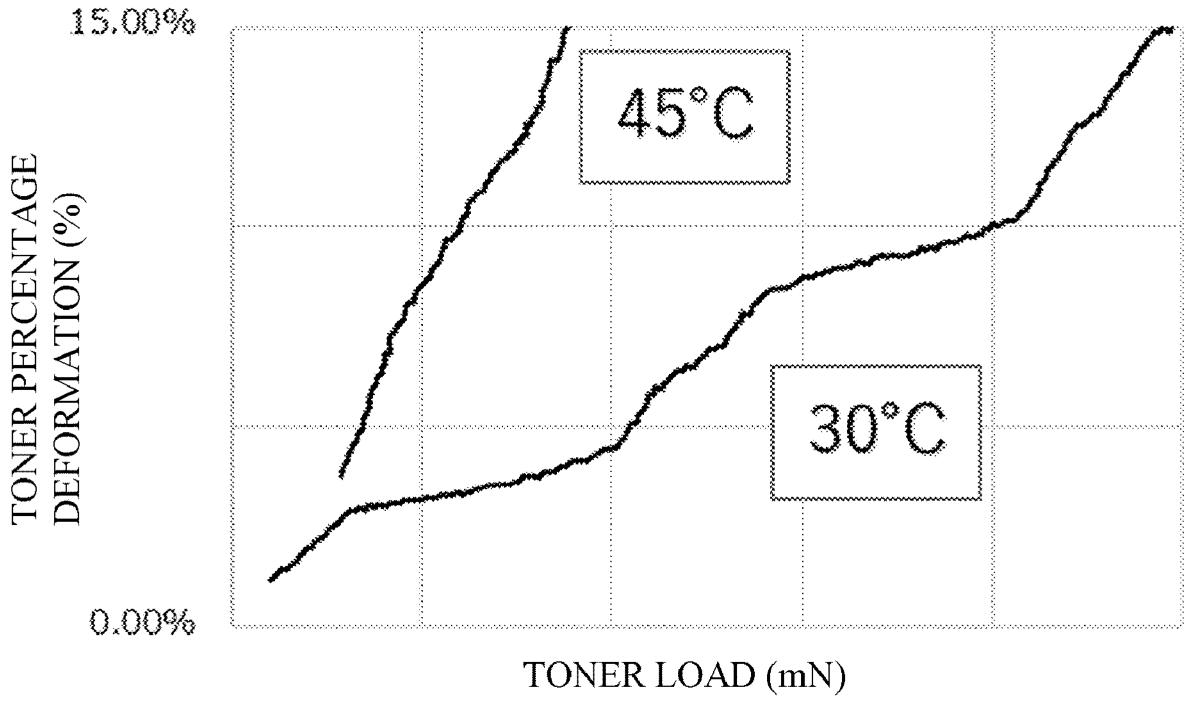
FIG. 1 is a conceptual diagram of load-percentage deformation curve.

In the present disclosure, the wordings "from XX to YY" and "XX to YY" expressing numerical value ranges mean numerical value ranges including the lower limit and the upper limit as endpoints, unless otherwise stated. When numerical value ranges are described stepwise, upper limits and lower limits of those numerical value ranges can be combined suitably.

The term "monomer unit" refers to a reacted form of a monomer material included in a polymer. For example, a section including a carbon-carbon bond in a main chain of a polymer formed through polymerization of a vinyl monomer will be referred to as a single unit. A vinyl monomer can be represented by the following formula (Z).

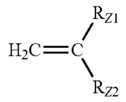

(Z)

In the formula (Z), $R_{Z1}$ represents a hydrogen atom or an alkyl group (preferably, an alkyl group having 1 to 3 carbon atoms, and more preferably a methyl group), and $R_{Z2}$ represents any substituent.

The present disclosure relates to a toner comprising a toner particle, wherein the toner particle comprises a binder resin and wax, and where with respect to a slope X of a straight line obtained by performing a micro-compression test on one particle of the toner, obtaining a relationship of a deformation amount (μm) with respect to a load (mN), calculating a percentage deformation (%), which is a ratio of the deformation amount to a particle diameter of the particle that was measured, plotting a load (mN)-percentage deformation (%) plot, and then using all the points plotted within the range in which the percentage deformation was 15% or less of the particle diameter of the particle that was measured for approximation by a least squares method, the slope X measured at 30° C. is denoted by X30 and the slope X measured at 45° C. is denoted by X45, the X30 is 25 to 300, and the X45 is 400 to 1000.

As a result of extensive studies, the present inventors have found that it is possible to obtain a toner with improved low-temperature fixability under light load while maintaining durability under high-temperature and high-humidity conditions by satisfying the abovementioned features. The inventors presume the reason for this as follows.

When the present inventors observed the toner that had undergone the fixing process under a light load, the percentage deformation of the toner was about 15% of the particle diameter. Accordingly, it was thought that fixing with a light load would be possible by reducing the force required to deform by 15% the toner to which the instantaneous amount of heat provided during fixing is applied.

At the same time, it was thought that by maintaining the appropriate hardness of the toner under conditions corresponding to a high-temperature environment, both development durability and fixing performance can be achieved.

The present inventors focused attention on a slope X of a straight line obtained by obtaining a relationship of a deformation amount (μm) with respect to a load (mN) in a micro-compression test on one particle of the toner, calculating a percentage deformation (%), which is the ratio of the deformation amount to a particle diameter of the particle that was measured, plotting a load (mN)-percentage deformation (%) plot, and then using all the points plotted within the range in which the percentage deformation was 15% or less of the particle diameter of the particle that was measured for approximation by a least squares method. X30, which is the average percentage deformation X measured at 30° C., needs to be from 25 to 300, and X45, which is the average percentage deformation X measured at 45° C., needs to be from 400 to 1000.

The larger the average percentage deformation X, the larger the deformation amount of the toner when the same load is applied.

When X30 is within the above range in the micro-compression test at 30° C., the toner has appropriate hardness, so that development durability can be maintained in the development process under high-temperature and high-humidity conditions.

Meanwhile, it is shown that when X45 is within the above range in a micro-compression test at 45° C., the toner percentage deformation reaches 15% of the particle diameter under a light load, and fixing performance can be improved.

X45 being from 400 to 1000 in the micro-compression test means that the percentage deformation reaches 15% of the particle diameter under a relatively light load as described above. The reason why attention was focused on the range of the percentage deformation of 15% or less is that the percentage deformation of the toner is considered to be about 15% in the fixing process with a light load.

Also, it is believed that by setting the measurement temperature of the micro-compression test to 45° C., the stress that the toner receives in the fixing process in image formation with a light load can be reproduced. This is because the pressure applied to one particle of the toner in the fixing process and the pressure applied to one particle of the toner in the micro-compression test approximately match each other, and the total amount of heat given to the toner during measurement and the instantaneous amount of heat given to the toner during fixing approximately match each other.

X45 is preferably from 600 to 900, more preferably from 600 to 880. Where X45 is less than 400, low-temperature fixing under a light load is difficult. Meanwhile, when X45 exceeds 1000, excessive melting and spreading of the toner tend to occur during fixing, so that hot offset tends to occur.

X30 being from 25 to 300 shows that when one particle of the toner is micro-compressed at 30° C., the load at which the percentage deformation of the particle becomes 15% of the particle diameter of the particle that was measured is relatively large, and the toner maintains sufficient hardness. Assuming that the high-temperature environment is about 30° C., it is considered that the development process under the high-temperature environment can be reproduced by setting the measurement temperature of the micro-compression test to 30° C.

Another reason why attention is focused on the percentage deformation of 15% or less is that the toner begins to undergo plastic deformation in the vicinity of the percentage deformation reaching 15%. Where X45 satisfies the above range, there is concern about deterioration of the toner during development in a high-temperature environment, but where X30 is within the above range, deterioration of the toner due to stress in the developing device is suppressed, and stable developing performance can be maintained over a long period of time.

Where X30 is less than 25, the toner tends to crack and contamination of the member tends to occur. Where X30 exceeds 300, the toner is soft and, therefore, deforms and crushes in the container, which tends to cause streaks on the fixed image. In addition, storage stability tends to deteriorate.

X30 is preferably from 25 to 270, more preferably from 150 to 270, and even more preferably from 170 to 270.

The inventors of the present invention have diligently studied the toner with the above characteristics and found that X30 and X45 can be easily controlled within the above ranges by combining the following three conditions:

(1) the toner particle contains a binder resin that is highly compatible with wax;

(2) the toner particle contains a resin that has high mobility when heated and effectively diffuses the wax; and (3) the toner particle surface has a protruding shape that effectively propagates stress.

The inventors consider the mechanism as follows.

In the fixing process, where the toner particle surface has a protruding shape, the curved surface of the protrusion becomes a contact surface with a member such as a fixing roller, and the contact area with the fixing roller becomes smaller, so the force that the toner receives from the fixing roller can be concentrated at one point. Further, it is considered that because of the protruding shape, the contact area between the protruding shape and the surface of the toner core particle is large, and the stress is easily propagated to the toner core particle surface.

This makes it easier to promote deformation in the initial stage of fixing under heating. It is considered that, as a result, even in a light-load fixing system with low pressure, the force is efficiently transmitted and it is possible to promote the deformation at the initial stage of fixing.

In addition, since the toner particle contains a binder resin that is highly compatible with wax and furthermore contains a resin that has high mobility and effectively diffuses wax, the amount of heat in the fixing process is effectively conducted to the inside of the toner particle, and the binder resin and the wax instantly become compatible with each other. It is considered that these protruding shape, binder resin and wax made it easy to control X45 within the above range (especially 400 or more) and enabled the achievement of low-temperature fixability under light load.

Meanwhile, since the toner particle surface has a protruding shape, the toner-to-member and toner-to-toner contact area is reduced, thereby making it easier to control X30 within the above range while increasing X45 as described above and improving fixing performance under light load. It is considered that as a result, the storage stability and durability in a high-temperature and high-humidity environment have improved.

Preferred embodiments of the configuration of the toner are described below.

The toner has a toner particle. The toner particle contains a binder resin and wax. The wax is preferably a material having high plasticity with respect to the binder resin. For example, an ester wax, which has high plasticity with respect to the binder resin and is used as a softening agent, can be used. That is, the wax is preferably an ester wax. Where the toner particle contains an ester wax, the inside of the toner particle has a soft structure with sharp melt property. Therefore, it becomes easier to control X45 to 400 or more.

Although the ester wax is not particularly limited, it preferably includes an ester compound of a diol and an aliphatic monocarboxylic acid. Further, it is more preferable that the ester wax include an ester compound of an aliphatic diol having from 2 to 6 (preferably from 2 or 3) carbon atoms and an aliphatic monocarboxylic acid having from 14 to 22 (preferably from 14 to 18) carbon atoms.

In addition, the ester wax preferably includes a monomer unit derived from ethylene glycol. That is, it is more preferable that the ester wax include an ester compound of ethylene glycol and an aliphatic monocarboxylic acid having from 14 to 22 (preferably from 14 to 18) carbon atoms.

Examples of diols include ethylene glycol, diethylene glycol, 1,3-propanediol, 1,4-butanediol, 1,6-hexanediol, 1,8-octanediol, 1,10-decanediol, and bisphenols A such as bisphenol A and hydrogenated bisphenol;

Meanwhile, examples of aliphatic monocarboxylic acids include myristic acid, palmitic acid, stearic acid, arachidic acid, behenic acid, lignoceric acid, cerotic acid, montanic acid, melissic acid, oleic acid, vaccenic acid, linoleic acid, linolenic acid, and the like.

A single ester compound may be used for the ester wax, or two or more ester compounds may be used in combination.

In addition, although synthetic ester waxes such as those described above may be used, naturally derived ester waxes such as carnauba wax and rice wax may also be used. When a synthetic ester wax is used, as described above, from the viewpoint of obtaining a low molecular weight ester wax, it is preferable that at least one of the carboxylic acid component and the alcohol component does not include a divalent (dihydric) or higher component, or contains only a small amount thereof.

As for the molecular weight of the ester wax, the main peak molecular weight (Mp) is preferably in the range of from 400 to 1500, more preferably from 500 to 1000. As a result, it is possible to obtain a toner having excellent low-temperature fixability.

The content of the ester wax is preferably from 10.0 parts by mass to 25.0 parts by mass, more preferably from 12.0 parts by mass to 20.0 parts by mass with respect to 100 parts by mass of the binder resin. When the content of the ester wax is within the above range, it is easy to satisfy the heat resistance storage stability required for the toner.

The melting point of the ester wax is preferably from 30° C. to 120° C., more preferably from 60° C. to 90° C. When the melting point of the ester wax is within the above range, the wax is easily melted in the fixing process, and the fixability is less likely to be impaired.

Also, the binder resin preferably contains a resin A having a monomer unit M1. Where the SP value of the ester wax in the Fedors method is denoted by SP (W) and the SP value of the monomer unit M1 of the resin A is denoted by SP (M1), the absolute difference $|SP(M1)-SP(W)|$ between SP (M1) and SP (W) is preferably 1.00 or less. The unit of the SP value is $(J/cm^3)^{0.5}$.

Where the above relationship between SP values is satisfied, the compatibility between the binder resin and the ester wax can be improved, and thermoplasticity can be promoted. Therefore, it becomes easier to control X30 and X45 within the above range. From the viewpoint of storage stability, |SP (M1)−SP (W)| is more preferably from 0.10 to 1.00, still more preferably from 0.20 to 0.80, and even more preferably from 0.20 to 0.70.

From the viewpoint of the SP value, the monomer unit M1 of the resin A more preferably has a structure represented by the following formula (1). The content of the monomer unit M1 in the binder resin is preferably from 3.0% by mass to 30.0% by mass, more preferably from 5.0% by mass to 20.0% by mass, and even more preferably from 6.0% by mass to 15.0% by mass. When the content of the monomer unit M1 is within the above range, the low-temperature fixability can be further enhanced.

(1)

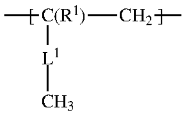

In formula (1), $L^1$ represents $—COO(CH_2)_n—$ (n is an integer of from 11 to 31 (preferably from 11 to 22, more preferably from 11 to 18)), and the carbonyl of $L^1$ is bonded to a carbon atom of the main chain (the carbon atom having $R^1$). $R^1$ represents a hydrogen atom or a methyl group. Having the monomer unit represented by formula (1) makes it easier to increase the compatibility between the wax and the binder resin and makes it easier to control X45 to 400 or more.

Where the resin A contains a plurality of types of monomer units that satisfy the requirements for the monomer unit M1, the SP (M1) value is the weighted average of the SP values of the respective monomer units. For example, where the content of a monomer unit M1-1 having an SP value of SP (M1-1) is A mol % based on the number of moles of all the monomer units satisfying the requirements for the monomer unit M1, and the content of a monomer unit M1-2 having an SP value of SP (M1-2) is (100-A) mol % based on the number of moles of all the monomer units satisfying the requirements for the monomer unit M1, the SP value (SP (M1)) is $$SP(M1) = (SP(M-1) \times A + SP(M1-2) \times (100-A))/100.$$

A similar calculation is performed when three or more types of monomer units satisfying the requirements for the monomer unit M1 are included.

From the viewpoint of improving compatibility with the ester wax, the resin A is preferably a styrene acrylic copolymer. For example, the resin A is a styrene acrylic copolymer having a monomer unit M1. From the viewpoint of heat-resistant storage stability, the resin A preferably further contains a monomer unit M2 represented by the following formula (2) (a monomer unit based on styrene).

(2)

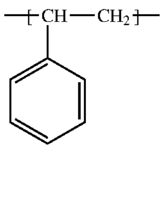

The content of the monomer unit M2 represented by formula (2) in the resin A is preferably from 45.0% by mass to 85.0% by mass, more preferably from 60.0% by mass to 80.0% by mass. When the content of the monomer unit M2 is within the above range, it becomes easier to control X30 to 300 or less, and it becomes easier to improve development durability. Moreover, the heat-resistant storage stability can be further improved.

The resin A may be composed only of the monomer unit M1 and the monomer unit M2 or may be obtained by copolymerizing one or more other monomer units in addition to the monomer unit M1 and the monomer unit M2. The polymerizable monomer to be used for copolymerization can be selected, as appropriate, according to the toner particle to be produced. For example, a radical-polymerizable vinyl-based monomer can be used. A monofunctional polymerizable monomer or a polyfunctional polymerizable monomer can be used as the vinyl-based polymerizable monomer.

Examples of monofunctional polymerizable monomers include the following.

Styrene; styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, and the like; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, 2-benzoyloxyethyl acrylate, and the like; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, dibutyl phosphate ethyl methacrylate, and the like; methylene aliphatic monocarboxylic acid esters; vinyl esters such as vinyl acetate, vinyl propionate, vinyl butyrate, vinyl benzoate, vinyl formate, and the like; vinyl ethers such as methyl ether, vinyl ethyl ether, vinyl isobutyl ether, and the like; vinyl ketones such as vinyl methyl ketone, vinyl hexyl ketone, vinyl isopropyl ketone, and the like.

Examples of polyfunctional polymerizable monomers include the following. diethylene glycol diacrylate, triethylene glycol diacrylate, tetraethylene glycol diacrylate, polyethylene glycol diacrylate, 1,6-hexanediol diacrylate, neopentyl glycol diacrylate, tripropylene glycol diacrylate, polypropylene glycol diacrylate, 2,2'-bis(4-(acryloxy-diethoxy)phenyl)propane, trimethylolpropane triacrylate, tetramethylolmethane tetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2'-bis(4-(methacryloxy-diethoxy)phenyl)propane, 2,2'-bis (4-(methacryloxypolyethoxy)phenyl)propane, trimethylolpropane trimethacrylate, tetramethylolmethane tetramethacrylate, divinylbenzene, divinylnaphthalene, divinyl ether, and the like.

The resin A preferably further has a monomer unit of a (meth)acrylic acid alkyl ester (more preferably n-butyl acrylate) having an alkyl group having from 1 to 8 (preferably from 2 to 6) carbon atoms. The content ratio of the monomer units of the (meth)acrylic acid alkyl ester in the resin A is preferably from 5.0% by mass to 40.0% by mass, more preferably from 8.0% by mass to 25.0% by mass.

From the viewpoint of heat resistance, development durability, and hot-offset resistance, the tetrahydrofuran-soluble matter (THF-soluble matter) of the resin A preferably has a weight-average molecular weight Mw of from 100000 to 450000, more preferably from 350000 to 420000 as determined by gel permeation chromatography (GPC). Within the above range, it becomes easier to achieve durability under high-temperature and high-humidity conditions and low temperature fixability under light load. In addition, heat-resistant storage stability and hot-offset resistance can be improved.

It is preferable that the binder resin contain a resin B and the resin B have a monomer unit M2 represented by formula (2). The tetrahydrofuran-soluble matter of the resin B preferably has a weight-average molecular weight Mw of from 2000 to 5000, more preferably of from 2200 to 4000 as determined by gel permeation chromatography.

Where the binder resin contains a low-molecular-weight resin such as resin B, the momentum of molecules during fixing is large, and the wax can be effectively diffused into the binder resin. In addition, since it is considered that due to the low molecular weight, this resin is softer and more thermally conductive than resins with a high molecular weight, heat can be easily transferred to the inside of the toner, and it is possible to promote plasticization by heat. In addition, the monomer unit M2 represented by formula (2) can prevent the resin B from becoming too soft, ensuring heat resistance. These factors make it easier to control X30 and X45 within the above ranges.

The resin B may be composed of the monomer unit M2 alone, or may be a copolymer of the monomer unit M2 and one or more other monomer units. The polymerizable monomer to be used for copolymerization can be selected, as appropriate, according to the toner particle to be produced. For example, a radical-polymerizable vinyl-based monomer can be used. A monofunctional polymerizable monomer or a polyfunctional polymerizable monomer can be used as the vinyl-based polymerizable monomer.

As the monofunctional polymerizable monomer and the polyfunctional polymerizable monomer, the monofunctional polymerizable monomers and polyfunctional polymerizable monomers exemplified for the resin A can be used. For example, n-butyl acrylate is preferred.

The content ratio of the monomer unit M2 in the resin B is preferably from 90.0% by mass to 100.0% by mass, more preferably from 95.0% by mass to 99.9% by mass. When the content of the monomer unit M2 is within the above range, the compatibility with the resin A can be further enhanced.

The content of the resin B in the toner is preferably from 3.0% by mass to 12.0% by mass, more preferably from 5.0% by mass to 10.0% by mass. Where the content is 3.0% by mass or more, the effect of heat conduction by the resin B can be sufficiently obtained. Where the content is 12.0% by mass or less, the development durability, storage stability, and hot-offset resistance can be improved.

The glass transition point of the resin B is preferably from 40° C. to 100° C. Where the glass transition point is 40° C. or higher, the strength of the toner particle as a whole is further improved, and the developing property is likely to be further improved during the durability test. Meanwhile, where the glass transition point is 100° C. or less, fixing defects are less likely to occur. The glass transition point of the resin B is preferably from 40° C. to 70° C., more preferably from 40° C. to 65° C.

In the molecular weight distribution chart obtained by measuring the THF-soluble matter of the toner by gel permeation chromatography (GPC), it is preferable to have a main peak in the molecular weight range of from 10000 to 300000. Here, the main peak is defined as the maximum peak molecular weight (Mp) obtained in the molecular weight range of from 10000 to 300000 in the obtained molecular weight distribution. Where the main peak is within the above range, the hardness of the toner as a whole can be controlled, and development durability can be further improved.

The main peak is more preferably obtained in the region of from 12000 to 25000, more preferably in the region of from 15000 to 22000. The position of the main peak can be controlled by adjusting the temperature during production of the toner core particles and the amount of the polymerization initiator.

Further, in the GPC measurement, the content ratio of the component having a weight-average molecular weight of from 2000 to 5000 and contained in the THF soluble matter of the toner is preferably from 8.0% by mass to 15.0% by mass, more preferably from 10.5% by mass to 13.0% by mass based on the mass of the toner.

When the content of the component having a weight-average molecular weight of from 2000 to 5000 is within the above range, the development durability, storage stability, and hot-offset resistance can be improved.

The toner particle preferably has protrusions made of an organosilicon polymer. For example, the toner particle has a toner core particle containing a binder resin and wax, and protrusions formed by an organosilicon polymer on the surface of the toner core particle. Where the toner particle has protrusions containing an organosilicon polymer, the curved surface of the protrusions becomes a contact surface with the member, and the contact area with the fixing roller becomes smaller, so the force received by the toner from the fixing roller can be concentrated at one point.

Further, it is considered that because of the protruding shape, the contact area of the protrusions with the toner particle surface is large, and the stress is easily propagated to the toner particle surface. It is believed that this makes it possible to promote the deformation at the initial stage of fixing. In addition, since the surface of the toner particle has appropriate hardness, development durability can be ensured. Therefore, it becomes easier to control X30 and X45 within the above range.

Since the organosilicon polymer has an appropriate hardness, the protrusions containing the organosilicon polymer improve the development durability and at the same time effectively act on the propagation of stress during pressurization and can further improve fixing performance in a light-load fixing system.

Conventionally, coating a toner particle surface with an organosilicon polymer improved the development durability, but there was a concern that fixing would be hindered. In the present application, by forming protrusions of an organosilicon polymer on the toner core particle containing a specific binder resin, efficient stress propagation into the toner is enabled and X30 and X45 can be easier controlled within the above specific ranges. As a result, both development durability and low-temperature fixability in a light-load fixing system can be achieved.

The organosilicon polymer preferably has a structure represented by the following formula (3).

$$R-SiO_{3/2} \quad (3)$$

(In formula (3), R represents an alkyl group having from 1 to 6 carbon atoms or a phenyl group, preferably an alkyl group having from 1 to 3 carbon atoms, and more preferably a methyl group.)

Also, in observing a toner cross section with a scanning electron microscope (STEM), the number-average value of the widths of the protrusions is defined as R (number-average width R). At this time, R is preferably from 80 nm to 250 nm, more preferably from 90 nm to 140 nm.

Where the number-average width R is 80 nm or more, the contact area between the toner core particle surface and the protrusions does not become too small, the force received from the member during fixing is easily propagated from the protrusions to the toner core particle surface, and deformation at the initial stage of fixing can be promoted.

In addition, where the number-average width R is 250 nm or less, it is possible to prevent the area of the toner particle surface covered by one protrusion from becoming too large, so that more superior low-temperature fixability is obtained.

The number-average width R can be controlled by the content of the monomer unit represented by formula (4) in the toner and pH, concentration, temperature, time, and the like when forming the protrusions.

Further, the average height of the protrusions measured by a scanning probe microscope is denoted by H. At this time, H is preferably from 25 nm to 100 nm, more preferably from 30 nm to 80 nm. Where the average height H is 25 nm or more, the contact surface area between the toner and the fixing roller does not become too large, the force applied to the toner can be concentrated on the contact surface, and the deformation at the initial stage of fixing can be promoted.

In addition, where the average height H is 100 nm or less, the distance from the contact surface of the protrusion with the member to the toner core particle surface can be prevented from becoming too large, so that more superior fixing performance is obtained.

The average height H can be controlled by the addition amount of the organosilicon compound forming the organosilicon polymer or pH, concentration, and the like when forming the protrusions.

The value R/H of the ratio of the number-average width R to the average height H is preferably from 1.5 to 3.7, more preferably from 2.0 to 3.6, and even more preferably from 3.0 to 3.6.

Where the value of R/H is 1.5 or more, it is possible to prevent the width of the protrusion from becoming too small relative to the height, so that the protrusions can be prevented from migrating to the member when repeatedly subjected to mechanical stress.

Where the value of R/H is 3.7 or less, the area where the protrusions on the toner particle surface come into contact with the member becomes small. In addition, it is possible to maintain a suitable distance between the toner particle and the member. As a result, the stress can be propagated more efficiently and fixing performance is further improved.

The coverage ratio of the toner particle surface with the organosilicon polymer is preferably from 35% by area to 60% by area, more preferably from 40% by area to 55% by area, and even more preferably from 45% by area to 50% by area.

Where the coverage ratio is 35% by area or more, the number of contact points with the member does not become too small, and the protrusions can be prevented from migrating to the member when repeatedly subjected to mechanical stress.

Where the coverage ratio is 60% by area or less, the area where the protrusions containing the organosilicon polymer are connected to each other becomes small and fixation is unlikely to be inhibited.

The coverage ratio can be controlled by the addition amount of the organosilicon compound forming the organosilicon polymer, or pH, time, and the like during hydrolysis of the organosilicon compound. In addition, the coverage ratio can be controlled by the content of the monomer unit represented by formula (4) in the toner and pH, concentration, temperature, time, and the like when forming the protrusions.

It is preferable that the toner particle have protrusions formed by an organosilicon polymer on the surface and that the organosilicon polymer have a structure represented by formula (3).

In the organosilicon polymer having the structure of formula (3), one of the four valences of Si atoms is bonded to R and the remaining three are bonded to O atoms. The O atom forms a state in which both of its two valences are bonded to Si, that is, a siloxane bond (Si—O—Si). Considering Si atoms and O atoms as those of an organosilicon polymer, an expression of $-SiO_{3/2}$ is used because there are three O atoms for two Si atoms. The $-SiO_{3/2}$ structure of this organosilicon polymer is considered to have properties similar to those of silica ($SiO_2$) composed of a large number of siloxane bonds.

In the structure represented by formula (3), R is preferably an alkyl group having from 1 to 6 carbon atoms, more preferably an alkyl group having from 1 to 3 carbon atoms.

Preferred examples of the alkyl group having from 1 to 3 carbon atoms include a methyl group, an ethyl group, and a propyl group. More preferably, R is a methyl group.

The organosilicon polymer is preferably a condensation polymer of an organosilicon compound having a structure represented by the following formula (Y).

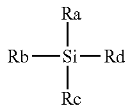

(Y)

In formula (Y), Ra represents a hydrocarbon group having from 1 to 6 carbon atoms (preferably an alkyl group having from 1 to 6 carbon atoms which is the same as R in formula (3)), and Rb, Rc and Rd each independently represent a halogen atom, a hydroxy group, an acetoxy group, or an alkoxy group.

Ra is preferably an aliphatic hydrocarbon group having from 1 to 3 carbon atoms, more preferably a methyl group.

Rb, Rc and Rd are each independently a halogen atom, a hydroxy group, an acetoxy group, or an alkoxy group (hereinafter also referred to as a reactive group). These reactive groups undergo hydrolysis, addition polymerization and condensation polymerization to form a crosslinked structure.

From the viewpoint of mild hydrolyzability at room temperature and precipitation property on the toner core particle surface, an alkoxy group having from 1 to 3 carbon atoms is preferable, and a methoxy group or an ethoxy group is more preferable.

In addition, the hydrolysis, addition polymerization and condensation polymerization of Rb, Rc and Rd can be controlled by the reaction temperature, reaction time, reaction solvent, and pH. To obtain an organosilicon polymer, organosilicon compounds having three reactive groups (Rb, Rc and Rd) in one molecule, excluding Ra in the formula (Y) (hereinafter also referred to as a trifunctional silane), may be used singly or in combination.

The compounds represented by the above formula (Y) include the following.

Trifunctional methylsilanes such as methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethohydroxysilane, methylethoxymethoxyhydroxysilane, and methyldiethoxyhydroxysilane.

Trifunctional silanes such ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, and hexyltrihydroxysilane.

Trifunctional phenylsilanes such as phenyltrimethoxysilane, phenyltriethoxysilane, phenyltrichlorosilane, phenyltriacetoxysilane, and phenyltrihydroxysilane.

In addition, an organosilicon polymer obtained by using the following compounds in combination with the organosilicon compound having the structure represented by formula (Y) may be used to the extent that the effects of the present invention are not impaired. An organosilicon compound with four reactive groups in one molecule (tetrafunctional silane), an organosilicon compound with two reactive groups in one molecule (bifunctional silane), or an organosilicon compound with one reactive group (monofunctional silanes). Examples thereof include the following.

Dimethyldiethoxysilane, tetraethoxysilane, hexamethyldisilazane, 3-aminopropyltrimethoxysilane, 3-aminopropyltriemethoxysilane, 3-(2-aminoethyl)aminopropyltrimethoxysilane, 3-(2-amino ethyl)aminopropyltriethoxysilane, and trifunctional vinylsilanes such as vinyltriisocyanatosilane, vinyltrimethoxysilane, vinyltriethoxysilane, vinyldiethoxymethoxysilane, vinylethoxydimethoxysilane, vinylethoxydihydroxysilane, vinyldimethoxyhydroxysilane, vinylethoxymethoxyhydroxysilane, and vinyldiethoxyhydroxysilane.

Further, the content of the organosilicon polymer in the toner particle is preferably from 1.0% by mass to 10.0% by mass.

The THF-soluble matter of the toner preferably includes a structure represented by the following formula (4). The structure represented by formula (4) may be a monomer unit represented by formula (4).

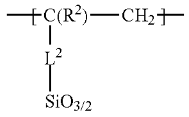

(4)

In formula (4), $L^2$ represents $—COO(CH_2)_n—$ (n is an integer of from 1 to 10 (preferably from 2 to 8)), and the carbonyl of $L^2$ is bonded to a carbon atom of the main chain (the carbon atom having $R^2$). $R^2$ represents a hydrogen atom or a methyl group.)

Since the structure represented by formula (4) includes the same $—SiO_3/2$ structure as the organosilicon polymer contained in the protrusions, the affinity is considered to be high. Where the THF-soluble matter of the toner has a partial structure represented by formula (4), when the protruding shape is formed on the toner particle surface, since the protrusions have a high affinity with the toner particle surface, the protrusions can spread by wetting. This makes it possible to control the number-average width R and average height H of the protrusions within the ranges described above. At the same time, the affinity between the toner core particle and the formed protrusions is increased, and the protrusions can be prevented from migrating to the member when repeatedly subjected to mechanical stress.

The content ratio of the structure represented by formula (4) is preferably from 0.01% by mass to 1.00% by mass, more preferably from 0.01% by mass to 0.10% by mass, based on the mass of the tetrahydrofuran-soluble matter of the toner. Where the content ratio of the structure represented by formula (4) is 0.01% by mass or more, it becomes easier to prevent the protrusions from migrating to the member when subjected to mechanical stress. Where the content ratio of the structure represented by formula (4) is 1.00% by mass or less, fixation is less likely to be inhibited, and X45 can be easily controlled within the above range.

The binder resin may include known resins other than the resin A and resin B without any particular limitation.

Specific examples include vinyl resins, polyester resins, polyurethane resins, polyamide resins, and the like. Examples of polymerizable monomers that can be used for the production of vinyl resins include styrene monomers such as styrene, α-methylstyrene, and the like; acrylic acid esters such as methyl acrylate, butyl acrylate and the like; methacrylic acid esters such as methyl methacrylate, 2-hydroxyethyl methacrylate, t-butyl methacrylate, 2-ethylhexyl methacrylate, and the like; unsaturated carboxylic acids such as acrylic acid, methacrylic acid, and the like; unsaturated dicarboxylic acids such as maleic acid and the like; unsaturated dicarboxylic acid anhydrides such as maleic anhydride and the like; nitrile-based vinyl monomers such as acrylonitrile and the like; halogen-containing vinyl monomers such as vinyl chloride; nitro-based vinyl monomers such as nitrostyrene and the like; and the like.

The toner particle may contain a colorant. As the colorant, known pigments and dyes of black, yellow, magenta, and cyan colors or other colors; magnetic members, and the like can be used without any particular limitation.

Examples of black colorants include black pigments such as carbon black and the like.

Examples of yellow colorants include yellow pigments and yellow dyes such as monoazo compounds; disazo compounds; condensed azo compounds; isoindolinone compounds; benzimidazolone compounds; anthraquinone compounds; azo metal complexes; methine compounds; allylamide compounds; and the like.

Specific examples include C. I. Pigment Yellow 74, 93, 95, 109, 111, 128, 155, 174, 180, 185, C. I. Solvent Yellow 162, and the like.

Examples of magenta colorants include magenta pigments and magenta dyes such as monoazo compounds; condensed azo compounds; diketopyrrolopyrrole compounds; anthraquinone compounds; quinacridone compounds; basic dye lake compounds; naphthol compounds: benzimidazolone compounds; thioindigo compounds; perylene compoundsl; and the like.

Specific examples include C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254, 269, C. I. Pigment Violet 19, and the like.

Examples of cyan colorants include cyan pigments and cyan dyes such as copper phthalocyanine compounds and derivatives thereof, anthraquinone compounds, basic dye lake compounds; and the like.

Specific examples include C. I. Pigment Blue 1, 7, 15, 15:1, 15:2, 15:3, 15:4, 60, 62, 66, and the like.

The content of the colorant is preferably from 1.0 parts by mass to 20.0 parts by mass with respect to 100.0 parts by mass of the binder resin or the polymerizable monomer forming the binder resin.

The toner can also be made into a magnetic toner by including magnetic bodies.

In this case, the magnetic bodies can also serve as a colorant.

Examples of magnetic bodies include iron oxides typified by magnetite, hematite, and ferrite; metals typified by iron, cobalt, and nickel, alloys of these metals with metals such as aluminum, cobalt, copper, lead, magnesium, tin, zinc, antimony, beryllium, bismuth, cadmium, calcium, manganese, selenium, titanium, tungsten, and vanadium, and mixtures thereof.

The toner particle may contain other wax (release agent) in addition to the ester wax described above. Known waxes can be used without any particular limitation. Specifically, the following can be mentioned.

Paraffin waxes, microcrystalline wax, petroleum waxes represented by petrolactam and derivatives thereof, montan wax and derivatives thereof, Fischer-Tropsch process hydrocarbon waxes and derivatives thereof, polyolefin waxes represented by polyethylene and derivatives thereof, carnauba wax, natural waxes represented by candelilla wax and derivatives thereof.

The derivatives include oxides, block copolymers with vinyl monomers, and graft-modified products.

In addition, alcohols such as higher fatty alcohols; fatty acids such as stearic acid, palmitic acid, and the like or amides, esters, and ketones thereof; hardened castor oil and derivatives thereof, vegetable waxes, and animal waxes. These can be used alone or in combination.

Among these, when polyolefins, hydrocarbon waxes obtained by the Fischer-Tropsch method, and petroleum-based waxes are used, developing performance and transferability tend to be advantageously improved. An antioxidant may be added to these waxes as long as the above effects are not affected.

The content of other waxes is preferably from 1.0 parts by mass to 30.0 parts by mass with respect to 100.0 parts by mass of the binder resin or the polymerizable monomers forming the binder resin. The melting point of other waxes is preferably from 30° C. to 120° C., more preferably from 60° C. to 100° C. By using the wax exhibiting the thermal properties as described above, the release effect is efficiently exhibited, and a wider fixing area is ensured.

The toner particle may contain a charge control agent. As the charge control agent, known charge control agents can be used without any particular limitation.

The following are examples of negative-charging charge control agents. Metal compounds of aromatic carboxylic acids such as salicylic acid, alkylsalicylic acids, dialkylsalicylic acids, naphthoic acid, dicarboxylic acids, and the like, or polymers or copolymers containing metal compounds of such aromatic carboxylic acids; polymers or copolymers having a sulfonic acid group, a sulfonic acid salt group or a sulfonic acid ester group; metal salts or metal complexes of azo dyes or azo pigments; boron compounds, silicon compounds, calixarene, and the like.

The following are examples of positive-charging charge control agents. Quaternary ammonium salts, polymeric compounds having a quaternary ammonium salt in a side chain; guanidine compounds; nigrosine compounds; imidazole compounds; and the like.

Examples of the polymer or copolymer having a sulfonic acid salt group or a sulfonic acid ester group include homopolymers of sulfonic acid group-containing vinyl monomers such as styrenesulfonic acid, 2-acrylamido-2-methylpropanesulfonic acid, 2-methacrylamido-2-methylpropanesulfonic acid, vinylsulfonic acid, methacrylsulfonic acid, and the like, or copolymers of vinyl monomers shown in the section on the binder resin and the sulfonic acid group-containing vinyl monomers.

The content of the charge control agent is preferably from 0.01 parts by mass to 5.0 parts by mass with respect to 100.0 parts by mass of the binder resin or the polymerizable monomers forming the binder resin.

External additives such as various organic or inorganic fine particles may be externally added to the toner particle as necessary. The organic or inorganic fine particles preferably have a particle diameter of 1/10 or less of the weight-average particle diameter of the toner particles from the viewpoint of durability when added to the toner particles.

For example, the following are used as organic or inorganic fine particles.

(1) Flowability-imparting agents: silica, alumina, titanium oxide, carbon black, and carbon fluoride.

(2) Abrasives: metal oxides (for example, strontium titanate, cerium oxide, alumina, magnesium oxide, and chromium oxide), nitrides (for example, silicon nitride), carbides (for example, silicon carbide), metal salts (for example, calcium sulfate, barium sulfate, calcium carbonate).

(3) Lubricants: fluororesin powders (for example, vinylidene fluoride and polytetrafluoroethylene), fatty acid metal salts (for example, zinc stearate and calcium stearate).

(4) Charge control particles: metal oxides (for example, tin oxide, titanium oxide, zinc oxide, silica, and alumina) and carbon black.

The surface of the organic or inorganic fine particles may be hydrophobized in order to improve the flowability of the toner and enable uniform charging of the toner particle. Examples of treatment agents for hydrophobic treatment of organic or inorganic fine powder include unmodified silicone varnishes, various modified silicone varnishes, unmodified silicone oils, various modified silicone oils, silane compounds, silane coupling agents, other organosilicon compounds, and organotitanium compounds. These treating agents may be used alone or in combination.

An example of a method for obtaining toner particles will be described below, but this method is not limiting.

As a preferred method for forming the specific protruding shape on the toner particle surface, there is a method of condensing an organic silicon compound in an aqueous medium in which the toner core particles are dispersed to form protrusions on the toner particle surface.

Where protrusions are formed on the toner core particles, it is preferable that the following steps be included:

a step of obtaining a toner core particle dispersion liquid in which the toner core particles are dispersed in an aqueous medium (step 1), and a step of mixing an organic silicon compound (or a hydrolysate thereof) with the toner core particle dispersion liquid and subjecting the organosilicon compound to a condensation reaction in the toner core particle dispersion liquid to form protrusions including the organosilicon polymer on the toner core particles (step 2).

Examples of the method for obtaining the toner core particle dispersion liquid in step 1 include a method of using the toner core particle dispersion liquid, which has been produced in an aqueous medium, as it is, a method of adding the dried toner core particles to an aqueous medium and mechanically dispersing, and the like. When the dried toner core particles are dispersed in an aqueous medium, a dispersing aid may be used.

Known dispersion stabilizers and surfactants can be used as the dispersion aid.

Specifically, the following are examples of dispersion stabilizers.

Inorganic dispersion stabilizers such as tricalcium phosphate, hydroxyapatite, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, alumina, and the like; and organic dispersion stabilizers such as polyvinyl alcohol, gelatin, methylcellulose, methylhydroxypropylcellulose, ethylcellulose, sodium salt of carboxymethylcellulose, starch, and the like.

Examples of surfactants include the following. Anionic surfactants such as alkyl sulfates, alkylbenzene sulfonates, fatty acid salts, and the like; nonionic surfactants such as polyoxyethylene alkyl ethers, polyoxypropylene alkyl ethers, and the like; and cationic surfactants such as alkylamine salts, quaternary ammonium salts, and the like.

Among them, it is preferable that an inorganic dispersion stabilizer be included, and it is more preferable that a dispersion stabilizer including a phosphoric acid salt such as tricalcium phosphate, hydroxyapatite, magnesium phosphate, zinc phosphate, aluminum phosphate, and the like be included.

It is preferable that in step 1, the solid content concentration of the toner core particle dispersion liquid be adjusted to from 25% by mass to 50% by mass. Further, the pH of the toner core particle dispersion liquid is preferably adjusted to a pH at which the condensation of the organosilicon compound is unlikely to proceed. Since the pH at which the condensation of the organosilicon polymer is unlikely to proceed differs depending on the substance, it is preferable that the pH be within ±0.5 around the pH at which the reaction is most difficult to proceed.

In step 2, the organosilicon compound may be added as it is to the toner core particle dispersion liquid or may be added to the toner core particle dispersion liquid after hydrolysis. Addition after hydrolysis is preferable because the condensation reaction can be easily controlled and the amount of the organosilicon compound remaining in the toner core particle dispersion liquid can be reduced.

For example, as a pretreatment of the organosilicon compound, the organosilicon compound is hydrolyzed in a separate container. Where the amount of the organosilicon compound is 100 parts by mass, the load concentration for hydrolysis is preferably from 40 parts by mass to 500 parts by mass and more preferably from 100 parts by mass to 400 parts by mass of deionized water such as ion-exchanged water or RO water.

The hydrolysis is preferably carried out in an aqueous medium with pH adjusted using a known acid and base. It is known that the hydrolysis of organosilicon compounds is pH-dependent, and the pH at which the hydrolysis is to be performed is preferably changed, as appropriate, according to the type of the organosilicon compound. For example, when methyltriethoxysilane is used as the organosilicon compound, the pH of the aqueous medium is preferably from 2.0 to 6.0. The hydrolysis conditions are preferably a temperature of from 15° C. to 80° C. and a time of from 30 min to 600 min.

Specific examples of acids for adjusting pH include the following.

Inorganic acids such as hydrochloric acid, hydrobromic acid, hydroiodic acid, hypochlorous acid, chlorous acid, chloric acid, perchloric acid, hypobromous acid, bromous acid, bromic acid, perbromic acid, hypoiodic acid, iodous acid, iodic acid, periodic acid, sulfuric acid, nitric acid, phosphoric acid, boric acid, and the like; and organic acids such as acetic acid, citric acid, formic acid, gluconic acid, lactic acid, oxalic acid, tartaric acid, and the like.

Specific examples of bases for adjusting pH include the following.

Alkali metal hydroxides such as potassium hydroxide, sodium hydroxide, lithium hydroxide, and the like and aqueous solutions thereof; alkali metal carbonates such as potassium carbonate, sodium carbonate, lithium carbonate, and the like and aqueous solutions thereof, alkali metal sulfates such as potassium sulfate, sodium sulfate, lithium sulfate, and the like and aqueous solutions thereof; alkali metal phosphates such as potassium phosphate, sodium phosphate, lithium phosphate, and the like and aqueous solutions thereof, alkaline earth metal hydroxides such as calcium hydroxide, magnesium hydroxide, and the like and aqueous solutions thereof, ammonia; amines such as triethylamine and the like; and the like.

In step 2, the temperature of the toner core particle dispersion liquid is preferably adjusted to 35° C. or higher.

The condensation reaction in step 2 is preferably controlled by adjusting the pH of the toner core particle dispersion liquid. It is known that the condensation reaction of organosilicon compounds is pH-dependent, and the pH at which the hydrolysis is to be performed is preferably changed, as appropriate, according to the type of the organosilicon compound. For example, when methyltrimethoxysilane is used as the organosilicon compound, the pH of the aqueous medium is preferably from 6.0 to 12.0. By adjusting the pH, it is possible to control, for example, the number-average value of the height H of the protrusions. Acids and bases exemplified in the section on hydrolysis can be used as acids and bases for adjusting the pH.

The amount of the hydrolysate is adjusted to from 5.0 parts by mass to 30.0 parts by mass of the organosilicon compound with respect to 100 parts by mass of the toner core particles, thereby facilitating the formation of the protruding shape. The temperature and time for forming the protruding shape and condensing are preferably maintained at from 35° C. to 99° C. and from 60 min to 72 h.

Any method may be used as a means for adjusting the protrusions to a specific shape. For example, there is a method of preliminarily treating the toner particle surface with a small amount of an organosilicon compound, and a method of adjusting the condensation method of the organosilicon compound by adjusting the pH, concentration, temperature, time, and the like, when forming the protrusions.

As a more specific example, there is a method in which the difference in the condensation reaction rate of the organosilicon compound between weak alkaline and strong alkaline conditions is used. The term "weakly alkaline", as used herein, refers to about pH 7.8 to pH 9.5 (more preferably about pH 8.0 to 8.5), and the term "strongly alkaline" refers to about pH 10.0 to pH 12.0. The present inventors presume that the reason why the production method using the difference in the condensation reaction rate can be used for control is that the condensation product of the organosilicon compound of the protrusion can be locally adjusted to a different degree of condensation.

For example, there is a method in which the reaction is carried out in weak alkalinity for about 1 min to 60 min (preferably 5 min to 20 min), then adjustment is performed to strong alkalinity and the reaction is carried out for about 1 h to 5 h (preferably 2 h to 4 h).

The coverage ratio of the toner particle surface with the organosilicon polymer can be controlled by adjusting the reactivity during formation of the organosilicon polymer. For example, adjustment to the above range can be performed by controlling the pH and retention time of the condensation reaction of the organosilicon compound, the addition amount of the hydrolysate of the organosilicon compound, and the like.

It is preferable to produce the toner core particles in an aqueous medium and form protrusions on the toner core particle surface by the organosilicon polymer.

A method for producing toner core particles is not particularly limited, and a suspension polymerization method, a dissolution suspension method, an emulsion aggregation method, a pulverization method, and the like can be used. Among them, in the suspension polymerization method, the organosilicon polymer tends to precipitate uniformly on the surface of the toner core particles, the organosilicon polymer has excellent adhesiveness, and good results are obtained in terms of environmental stability, charge quantity inversion component suppression effect, and durability thereof. As an example, a method for obtaining toner core particles by a suspension polymerization method will be described hereinbelow.

First, polymerizable monomers capable of forming a binder resin and, if necessary, various additives are mixed, and a disperser is used to prepare a polymerizable monomer composition in which the materials are dissolved or dispersed.

Examples of various additives include colorants, release agents, plasticizers, charge control agents, polymerization initiators, chain transfer agents, and the like.

Examples of dispersers include homogenizers, ball mills, colloid mills, ultrasonic dispersers, and the like.

Next, the polymerizable monomer composition is put into an aqueous medium including poorly water-soluble inorganic fine particles, and a high-speed disperser such as a high-speed stirrer or an ultrasonic disperser is used to prepare droplets of the polymerizable monomer composition (granulation step).

After that, the polymerizable monomers in the droplets of the polymerizable monomer composition are polymerized to obtain toner core particles (polymerization step).

The polymerization initiator may be mixed when preparing the polymerizable monomer composition or may be mixed into the polymerizable monomer composition immediately before forming the droplets in the aqueous medium.

The polymerization initiator can also be added in a state of being dissolved in a polymerizable monomer or another solvent, as necessary, during granulation of droplets or after completion of granulation, that is, immediately before starting the polymerization reaction.

After the polymerizable monomers are polymerized to obtain the binder resin, solvent removal treatment may be performed, as necessary, to obtain a toner core particle dispersion liquid.

As the polymerization initiator, a known polymerization initiator can be used without any particular limitation. Specific examples include the following.

Peroxide-based polymerization initiators represented by hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, ammonium persulfate, sodium persulfate, potassium persulfate, diisopropyl peroxycarbonate, tetralin hydroperoxide, 1-phenyl-2-methylpropyl-1-hydroperoxide, pertriphenylacetic acid-tert-hydroperoxide, tert-butyl performate, tert-butyl peracetate, tert-butyl perbenzoate, tert-butyl perphenylacetate, tert-butyl permethoxyacetate, per-N-(3-toluyl)palmitic acid-tert-butylbenzoyl peroxide, t-butyl peroxy-2-ethylhexanoate, t-butyl peroxypivalate, t-butyl peroxyisobutyrate, t-butyl peroxyneodecanoate, methyl ethyl ketone peroxide, diisopropyl peroxycarbonate, cumene hydroperoxide, 2,4-dichlorobenzoyl peroxide, lauroyl peroxide, and the like; diazo-based polymerization initiators represented by 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like; and the like.

Known methods can be used, without any particular restrictions, to include the resin having the structure represented by formula (4) in the toner. For example, there is a method of adding a Si-containing monomer having a structure represented by formula (4) in the reaction form after polymerization during the polymerization step of the toner core particles described above to obtain toner core particles containing the resin.

Other examples include a method of polymerizing the monomer in an aqueous medium in which the toner core particles are dispersed to obtain toner core particles containing the resin, and a method of polymerizing the monomer and adding the obtained polymer in a manufacturing process of the toner core particles to obtain toner core particles containing the resin.

For example, the resin A preferably includes a monomer unit represented by formula (4).

The monomer is not particularly limited, except that it has the partial structure, but specific examples include the following.

Trifunctional silane compounds having a methacryloxyalkyl group as a substituent, such as γ-methacryloxypropyltrimethoxysilane, γ-methacryloxypropyltriethoxysilane, γ-methacryloxyoctyltrimethoxysilane, γ-methacryloxypropyldiethoxymethoxysilane, γ-methacryloxypropylethoxydimethoxysilane, and the like; Trifunctional silane compounds having an acryloxyalkyl group as a substituent, such as γ-acryloxypropyltrimethoxysilane, γ-acryloxypropyltriethoxysilane, γ-acryloxyoctyltrimethoxysilane, γ-acryloxypropyldiethoxymethoxysilane, γ-acryloxypropylethoxydimethoxysilane, and the like.

In particular, it is preferable to use γ-methacryloxypropyltrimethoxysilane and γ-methacryloxypropyltriethoxysilane.

Various measurement methods are described below.

Method for Measuring X30 and X45

X30 and X45 are measured by a micro-compression test of the toner.

The measurement method of the micro-compression test will be described with reference to FIG. 1. FIG. 1 shows a profile (displacement curve) obtained by a micro-compression test for one toner particle. The horizontal axis represents the amount of load (mN) applied to the toner, and the vertical axis represents the percentage deformation (%) with respect to the particle diameter of the toner that was measured.

For the micro-compression test, a fine particle crushing force measuring device NS-A100 manufactured by Nano Seeds Corporation is used. A flat indenter having a spring constant of 0.014 mN/μm and a tip diameter of 10 μm is used. A flat indenter is used because the measurement accuracy is greatly affected when a sharp indenter is used for objects with a small diameter and spherical shape, objects with external additives attached, and objects with uneven surfaces, such as toners. The indentation amount in the test is set to 60 m, the compression is performed at a sample table moving speed of 0.2 μm/s, the test force corresponding to the displacement is continuously detected, and data are acquired every 0.1 sec.

The toner is applied onto a ceramic cell, and air is slightly blown so that the toner is dispersed over the cell. The cell is set in the device for measurement.

In the measurement, the cell is heated to 30° C. or 45° C. with the attached temperature regulator, and the temperature of this cell is used as the measurement temperature. In the micro-compression test, a cell in which toner is not dispersed is placed in a main body and allowed to stand for 10 min or more after the cell reaches the measurement temperature. Once the cell is detached from the main body, the toner is dispersed on the cell, and then the cell is installed in the main body again. Then, after the cell has reached the measurement temperature and was allowed to stand for 10 min or longer, the measurement is started.

For the measurement, a section of a measurement screen that has one particle of the toner is selected while watching the image of a CCD video camera attached to the device, and the initial position is adjusted so that one particle of the toner fits inside the tip of the indenter. In order to eliminate errors as much as possible, particles having a particle diameter of 0.2 m of the number-average particle diameter (D1) of the toner are selected for measurement. The measurement of D1 will be described hereinbelow.

Toner particles are randomly selected from the measurement screen, but the software provided with an ultra-micro-hardness tester ENT1100 is used as means for measuring the particle diameter of the toner on the measurement screen. Using the software, the major axis and minor axis of the particle are measured, and the value of [(major axis+minor axis)/2] is taken as the particle diameter of the particle.

Further, the major diameter refers to the diameter at which the length of the perpendicular to the two parallel lines formed by sandwiching the particle between the two parallel lines (the distance between the two parallel lines) is the maximum. In addition, the short diameter refers to the diameter at which the length of the perpendicular to the two parallel lines formed by sandwiching the particle between the two parallel lines is the minimum.

Regarding the measurement data, 100 arbitrary particles that satisfy the above conditions are selected and measured, and the analysis is performed using an "A100: Strain Amount Analysis Graph Creation Tool" provided with the fine particle crushing force measuring device "NS-A100". Where the measurement data are selected by selecting "Graph Creation" on the menu, the relationship between the load (mN) and the deformation amount (μm) is output as analysis data.

Using the obtained deformation amount, the "percentage deformation (%)", which is the ratio of the deformation amount to the particle diameter of the particle that was measured is calculated, and a load (mN)-percentage deformation (%) plot is obtained. A slope X (units: "%/nm") of a straight line obtained by approximation by a least squares method using all the points plotted within the range in which the percentage deformation was 15% or less of the particle diameter of the particle that was measured in the obtained load (mN)-percentage deformation (%) plot is calculated. For the "particle diameter of the particle that was measured", the major axis and minor axis of the particle are measured using the software provided with the ultra-micro-hardness tester ENT1100, and the value of [(major axis+minor axis)/2] is used.

The slope of the straight line is calculated for each of the 100 particles measured, slopes for 80 particles remaining after removing 10 largest and 10 smallest values are used as data, and the arithmetic average of the 80 slopes is used as the slope X. This slope X is obtained using the measurement data at 30° C. and 45° C., and the slope X obtained using the measurement data at 30° C. is denoted by X30, and the slope X obtained using the measurement data at 45° C. is denoted by X45.

Method for Measuring Weight-Average Particle Diameter (D4) and Number-Average Particle Diameter (D1) of Toner Particles or Toner A precision particle diameter distribution measuring device (trade name: Coulter Counter Multisizer 3) based on a pore electrical resistance method and dedicated software (trade name: Beckman Coulter Multisizer 3, Version 3.51, manufactured by Beckman Coulter Inc.) are used. An aperture diameter of 100 m is used, measurement is performed with 25,000 effective measurement channels, and the measurement data are analyzed and calculated. The electrolytic aqueous solution used for the measurement can be obtained by dissolving special grade sodium chloride in ion-exchanged water so that the concentration becomes 1% by mass. For example, ISOTON II (trade name) manufactured by Beckman Coulter Inc. can be used. Before performing measurement and analysis, the dedicated software is set as follows.

In the "Change Standard Measurement Method (SOM) Screen" of the dedicated software, the total count number in the control mode is set to 50,000 particles, the number of measurements is set to 1, and the Kd value is set to a value obtained using standard particles 10.0 m (manufactured by Beckman Coulter Inc.). By pressing the threshold/noise level measurement button, the threshold and noise level are automatically set. Also, the current is set to 1600 μA, the gain is set to 2, the electrolytic solution is set to ISOTON II (trade name), and the flush of aperture tube after measurement is checked.

In the "Pulse-to-Particle Diameter Conversion Setting Screen" of the dedicated software, the bin interval is set to logarithmic particle diameter, the particle diameter bin is set to 256 particle diameter bins, and the particle diameter range is set to from 2 m to 60 m.

The specific measurement method is as follows.

(1) A total of 200 mL of the electrolytic aqueous solution is placed into a 250 mL glass round-bottomed beaker dedicated to Multisizer 3, the beaker is set on a sample stand, and counterclockwise stirring is performed with a stirrer rod at 24 rev/sec. Then, dirt and air bubbles inside the aperture tube are removed by a "Flush Aperture" function of the analysis software.

(2) A total of 30 mL of the electrolytic aqueous solution is placed into a 100 mL flat-bottom glass beaker. Here, 0.3 mL of a diluted solution obtained by three-fold (by mass) dilution of CONTAMINON N (trade name) (a 10% by mass aqueous solution of a neutral detergent for cleaning precision measuring instruments, manufactured by Wako Pure Chemical Industries, Ltd.) with ion-exchanged water is added to the beaker.

(3) A predetermined amount of ion-exchanged water and 2 mL of CONTAMINON N (trade name) are added to the water tank of an ultrasonic disperser (trade name: Ultrasonic Dispersion System Tetora 150, manufactured by Nikkaki Bios Co., Ltd.) with an electrical output of 120 W in which two oscillators with an oscillation frequency of 50 kHz are incorporated with a phase shift of 180 degrees.

(4) The beaker of (2) is set in the beaker fixing hole of the ultrasonic disperser, and the ultrasonic disperser is actuated. The height position of the beaker is adjusted so that the resonance state of the liquid level of the electrolytic aqueous solution in the beaker is maximized.

(5) A total of 10 mg of toner (particles) is added little by little to the electrolytic aqueous solution in the beaker of (4) and dispersed while the electrolytic aqueous solution is being irradiated with ultrasonic waves. Then, the ultrasonic dispersion treatment is continued for another 60 sec. In the ultrasonic dispersion, the temperature of the water in the water tank is adjusted, as appropriate, to from 10° C. to 40° C.

(6) The electrolytic aqueous solution of (5) in which toner (particles) is dispersed is dropped using a pipette into the round-bottomed beaker of (1) set in the sample stand, and the measured concentration is adjusted to 5%. The measurement is continued until the number of measured particles reaches 50000.

(7) The measurement data are analyzed with the dedicated software provided with the device to calculate the weight-average particle diameter (D4). The "Average Diameter" on the analysis/volume statistics (arithmetic mean) screen when graph/% by volume is set using the dedicated software is taken as the weight-average particle diameter (D4). The "Average Diameter" on the analysis/number statistics (arithmetic mean) screen when graph/% by number is set using the dedicated software is taken as the number-average particle diameter (D1).

Composition Analysis of Wax

The composition analysis of the wax in the toner particle can be performed using nuclear magnetic resonance equipment ($^1$H-NMR, $^{13}$C-NMR) and a FT-IR spectrum. The equipment used is described below. Each sample may be collected by fractionating from the toner and analyzed.

(i) $^1$H-NMR, $^{13}$C-NMR

Measurement device: FT NMR device JNM-EX400 (manufactured by JEOL Ltd.)
Measurement frequency: 400 MHz
Pulse condition: 5.0 s
Frequency range: 10500 Hz
Accumulated times: 64 times (ii) FT-IR Spectrum AVATAR 360FT-IR, manufactured by Thermo Fisher Scientific Inc.

Fractionation of Resin a (Resin a Having a Structure Represented by Formula (4)) and Resin B from Toner Each physical property can also be measured using materials such as resin A and resin B fractionated from the toner by the following method.

A total of 10.0 g of toner particles is weighed, put in a cylindrical filter paper (No. 84 manufactured by Toyo Roshi K. K.), and placed in a Soxhlet extractor. Extraction is performed using 200 mL of THF as a solvent for 20 h, and the solid matter obtained by removing the solvent from the extract is the THF-soluble matter of the toner. The resins A and the resin B are included in the THF-soluble matter. This is done multiple times to obtain the required amount of THF-soluble matter.

For the solvent gradient elution method, gradient preparative HPLC (LC-20AP high-pressure gradient preparative system manufactured by Shimadzu Corporation, SunFire preparative column 50 mmφ, 250 mm manufactured by Waters Corp.) is used. The column temperature is 30° C., the flow rate is 50 mL/min, acetonitrile is used as a poor solvent and THF is used as a good solvent for mobile phases. A sample for separation is prepared by dissolving 0.02 g of the THF-soluble matter obtained by the extraction in 1.5 mL of THF. The mobile phase starts with a composition of 100% acetonitrile, and the proportion of THF is increased by 4% per minute when 5 min have passed after sample injection, until the composition of the mobile phase reaches 100% THF over 25 min. The components can be separated by drying the obtained fractions.

Which fraction component is the resin A or the resin B can be determined by $^1$H-NMR measurement, which will be described hereinbelow.

Calculation of Content Ratio of Resin B in Toner

The resin B is fractionated by the method described above. The content ratio of the resin B in the toner is calculated from the mass of the fractionated resin B and the total amount of the toner used for the fractionation.

Method for Identifying Monomer Units Contained in Resin a and Resin B and Measuring Content Ratio of Each Monomer Unit $^1$H-NMR spectrum measurement is used to identify various monomer units in the resin A and the resin B and to confirm whether the THF-soluble matter of the toner has the structure represented by formula (4).

In addition, the content ratio of each monomer unit contained in the resin is measured by $^1$H-NMR under the following conditions.

Measuring device: FT NMR device JNM-EX400 (manufactured by JEOL Ltd.)
Measurement frequency: 400 MHz
Pulse condition: 5.0 s
Frequency range: 10500 Hz
Accumulated times: 64 times
Measurement temperature: 30° C.
Sample: prepared by putting 50 mg of the resin A or the resin B as a measurement sample into a sample tube with an inner diameter of 5 mm, adding deuterated chloroform ($CDCl_3$) as a solvent, and dissolving in a constant temperature bath at 40° C.

Below, resin A will be described as an example.

From the obtained $^1$H-NMR chart, among the peaks attributed to the constituent elements of the monomer unit M1, a peak independent of the peaks attributed to the constituent elements of other monomer units is selected, and the integral value i1 of this peak is calculated.

Similarly, from among the peaks attributed to the constituent elements of the monomer unit M2, a peak independent of the peaks attributed to the constituent elements of the monomer units derived from other monomers is selected, and the integral value i2 of this peak is calculated.

From among the peaks attributed to the constituent elements of the structure (monomer unit) represented by formula (4), a peak independent of the peaks attributed to the constituent elements of the monomer units derived from other monomers is selected, and the integral value i3 of this peak is calculated.

The integral value I1 of the peak attributed to the methylene group of the polymer main chain of the resin containing the monomer unit M1 is calculated.

Similarly, the integral value 12 of the peak attributed to the methylene group of the polymer main chain of the resin containing the monomer unit M2 is calculated.

The integral value 13 of the peak attributed to the methylene group of the polymer main chain of the resin having the structure represented by formula (4) is calculated.

The content ratio of the monomer unit M1 is obtained as follows by using the integral values i1, i2, i3 and I1, 12, 13. Here, n1, n2, n3, N1, N2, and N3 are the numbers of hydrogen atoms in the constituent elements to which the peaks of interest for each segment are attributed.

n1 corresponds to i1, n2 corresponds to i2, n3 corresponds to i3, N1 corresponds to I1, N2 corresponds to 12, and N3 corresponds to 13.

$$\text{Content Ratio of Monomer Unit } M1 \text{ (Mol \%)} = \{(i1/n1)/(I1/N1)\} \times 100$$

Similarly, the content ratio of monomer unit M2 is obtained as follows.

$$\text{Content ratio of monomer unit } M2 \text{ (mol \%)} = \{(i2/n2)/(I2/N2)\} \times 100$$

$$\text{Content ratio (mol \%) of the partial structure represented by formula (4)} = \{(i3/n3)/(I3/N3)\} \times 100$$

The content ratio of the structure represented by formula (4) based on the THF-soluble matter of the toner is calculated using the content ratio of the structure represented by formula (4) and contained in the resin. The analysis can be performed in the same manner with respect to the resin B as well.

Method for Calculating SP (M1) and SP (W)

SP (M1) and SP (W) are obtained as follows according to the calculation method proposed by Fedors.

Vaporization energy (Δei) (cal/mol) and molar volume (Δvi) ($cm^3$/mol) are obtained from the tables described in "Polym. Eng. Sci., 14(2), 147-154 (1974) for atoms or atomic associations in each molecular structure, and $(4.184\times\Sigma\Delta ei/\Sigma\Delta vi)^{0.5}$ is defined as the SP value $(J/cm^3)^{0.5}$.

Specifically, the evaporation energy (Δei) and molar volume (Δvi) of the monomer unit M1 and the ester wax are obtained, and SP values are calculated from the following formula by dividing the evaporation energy by the molar volume.

$$SP(M1) \text{ or } SP(W) = \left\{4.184 \times \left(\sum_j \times \sum \Delta ei\right) / \left(\sum j \times \sum \Delta vi\right)\right\}^{0.5}$$

Method for Measuring Weight-Average Molecular Weight (Mw) and Maximum Peak Molecular Weight (Mp)

The weight-average molecular weight (Mw) and maximum peak molecular weight (Mp) of the THF-soluble matter, resin A or resin B of the toner are measured by gel permeation chromatography (GPC) in the following manner.

First, the sample is dissolved in tetrahydrofuran (THF) at room temperature over 24 h. Then, the obtained solution is filtered through a solvent-resistant membrane filter "Myshori Disc" (manufactured by Tosoh Corporation) having a pore diameter of 0.2 μm to obtain a sample solution. The sample solution is prepared so that the concentration of the component soluble in THF is 0.8% by mass. This sample solution is used for measurement under the following conditions.

Device: HLC8120 GPC (Detector: RI) (manufactured by Tosoh Corporation)

Columns: seven columns Shodex KF-801, 802, 803, 804, 805, 806, 807 (manufactured by Showa Denko K.K.)

Eluent: tetrahydrofuran (THF)

Flow rate: 1.0 mL/min

Oven temperature: 40.0° C.

Sample injection volume: 0.10 mL

In calculating the molecular weight of the sample, standard polystyrene resins (trade name "TSK Standard Polystyrene F-850, F-450, F-288, F-128, F-80, F-40, F-20, F-10, F-4, F-2, F-1, A-5000, A-2500, A-1000, A-500" manufactured by Tosoh Corporation) are used.

Content Ratio of Component with Weight-Average Molecular Weight of from 2000 to 5000 Contained in THF-Soluble Matter of Toner The toner is dissolved in tetrahydrofuran (THF), and the solvent is distilled off from the obtained soluble matter under reduced pressure to obtain the tetrahydrofuran (THF)-soluble matter of the toner.

The obtained tetrahydrofuran (THF)-soluble matter of the toner is dissolved in chloroform to prepare a sample solution with a concentration of 25 mg/ml. A total of 3.5 ml of the obtained sample solution is injected into the device described below, and a component having a weight-average molecular weight of from 2000 to 5000 is fractionated under the following conditions. The conditions for fractionation are as follows.

Preparative GPC device: preparative HPLC LC-980 type manufactured by Japan Analytical Industry Co., Ltd.

Preparative columns: JAIGEL 3H, JAIGEL 5H (manufactured by Japan Analytical Industry Co., Ltd.)

Eluent: chloroform

Flow velocity: 3.5 ml/min

After fractionating, the solvent is distilled off under reduced pressure, and further dried in an atmosphere of 90° C. under reduced pressure for 24 h. From the mass of the obtained solid and the injection amount of the sample solution, the content ratio of the component having a weight-average molecular weight of from 2000 to 5000 and contained in the THF-soluble matter of the toner is calculated.

Method for Confirming Structure Represented by Formula (3)

The following method is used to confirm the structure represented by formula (3) in the organosilicon polymer contained in the toner particle.

The hydrocarbon group represented by R in formula (3) is confirmed by $^{13}$C-NMR.

($^{13}$C-NMR (Solid) Measurement Conditions)

Device: JNM-ECX500II, manufactured by JEOL RESONANCE Inc.

Sample tube: 3.2 mmφ

Sample: 150 mg of tetrahydrofuran-insoluble matter in toner particle for NMR measurement
Measurement temperature: room temperature
Pulse mode: CP/MAS
Measurement nuclear frequency: 123.25 MHz ($^{13}C$)
Reference substance: adamantane (external standard: 29.5 ppm)
Sample rotation speed: 20 kHz
Contact time: 2 ms
Delay time: 2 s
Accumulated times: 1024 times In this method, the hydrocarbon group represented by R in formula (3) is confirmed by the presence/absence of a signal generated from a methyl group ($Si—CH_3$), an ethyl group ($Si—C_2H_5$), a propyl group ($Si—C_3H_7$), a butyl group ($Si—C_4H_9$), a pentyl group ($Si—C_5H_{11}$), a hexyl group ($Si—C_6H_{13}$), a phenyl group ($Si—C_6H_5$), or the like bonded to a silicon atom.

Furthermore, the structure that binds to Si is confirmed by solid-state $^{29}Si$-NMR by using the abovementioned sample.

($^{29}Si$-NMR (Solid) Measurement Conditions)
Device: JNM-ECX500II, manufactured by JEOL RESONANCE Inc.
Sample tube: 3.2 mmφ
Sample: 150 mg
Measurement temperature: room temperature
Pulse mode: CP/MAS
Measurement nuclear frequency: 97.38 MHz ($^{29}Si$)
Reference substance: DSS (external standard: 1.534 ppm)
Sample rotation speed: 10 kHz
Contact time: 10 ms
Delay time: 2 s
Accumulated times: 2000 times to 8000 times By the above measurement, the M unit structure, D unit structure, T unit structure and Q unit structure can be confirmed by curve fitting a plurality of silane components corresponding to the number of oxygen atoms bonded to Si. The structure represented by formula (3) corresponds to the T unit structure. Where it is necessary to confirm the structure in more detail, the results of 1H-NMR measurement may also be used for identification.

M unit

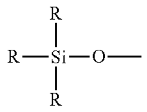

D unit

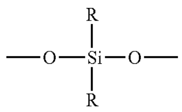

T unit

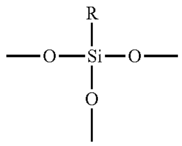

Q unit

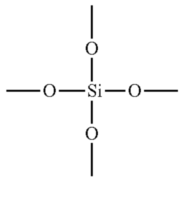

Method of Obtaining Toner Particles by Removing External Additive from Toner

When measuring the number-average width R and the average height H of the protrusions on the toner particle surface to which an external additive has been attached, the toner particles are obtained by removing the external additive by the following operation, and then the number-average width R and average height H of the protrusions are measured by the method.

A total of 160 g of sucrose (manufactured by Kishida Chemical Co., Ltd.) is added to 100 mL of ion-exchanged water and dissolved while heating in a hot water bath to prepare a 61.5% sucrose aqueous solution. A total of 31.0 g of the concentrated sucrose solution and 6 g of CONTAMINON N (trade name) (a 10% by mass aqueous solution of a neutral detergent for washing precision measuring instruments with a pH of 7 which is composed of a nonionic surfactant, an anionic surfactant, and an organic builder; manufactured by Wako Pure Chemical Industries, Ltd.) are placed in a centrifuge tube to prepare a dispersion liquid. Then, 1.0 g of toner is added to this dispersion liquid, and lumps of toner are loosened with a spatula or the like.

The centrifuge tube is shaken with a shaker at 300 spm (strokes per min) for 20 min. After shaking, the solution is transferred in a swing rotor glass tube (50 mL) and separated in a centrifuge at 3500 rpm for 30 min.

Sufficient separation of toner particles and the aqueous solution is visually confirmed, and toner particles separated in the uppermost layer are collected with a spatula or the like. The collected toner particles are filtered with a vacuum filter and dried with a dryer for 1 h or longer. The dried product is pulverized with a spatula to obtain toner particles.

Method for Calculating Number-Average Value R of Width of Protrusions

A cross section of the toner observed with a scanning transmission electron microscope (STEM) is prepared as follows.

The procedure for preparing the cross section of the toner will be described below.

First, the toner is scattered in a single layer on a cover glass (Matsunami Glass Ind., Ltd., square cover glass; square No. 1), and an Os film (5 nm) and a naphthalene film (20 nm) are applied as protective films by using Osmium Plasma Coater (Filgen, Inc., OPC80T).

Next, a PTFE tube (inner diameter 1.5 mm×outer diameter 3 mm) is filled with a photocurable resin D800 (JEOL Ltd.), and the cover glass is gently placed on the tube so that the toner comes into contact with the photocurable resin D800. After the resin is cured by light irradiation in this state, the cover glass and the tube are removed to form a columnar resin in which the toner is encapsulated in the outermost surface.

Using an ultrasonic ultramicrotome (Leica, UC7), cutting is performed at a cutting speed of 0.6 mm/s through a length equal to the radius of the toner (for example, 4 μm when the weight-average particle diameter (D4) is 8.0 m) from the outermost surface of the cylindrical resin to expose the cross section of the central portion of the toner.

Next, the toner is cut to a film thickness of 100 nm to prepare a thin sample of the cross section of the toner. A cross section of the central portion of the toner can be obtained by cutting by such a method.

Figure 2:
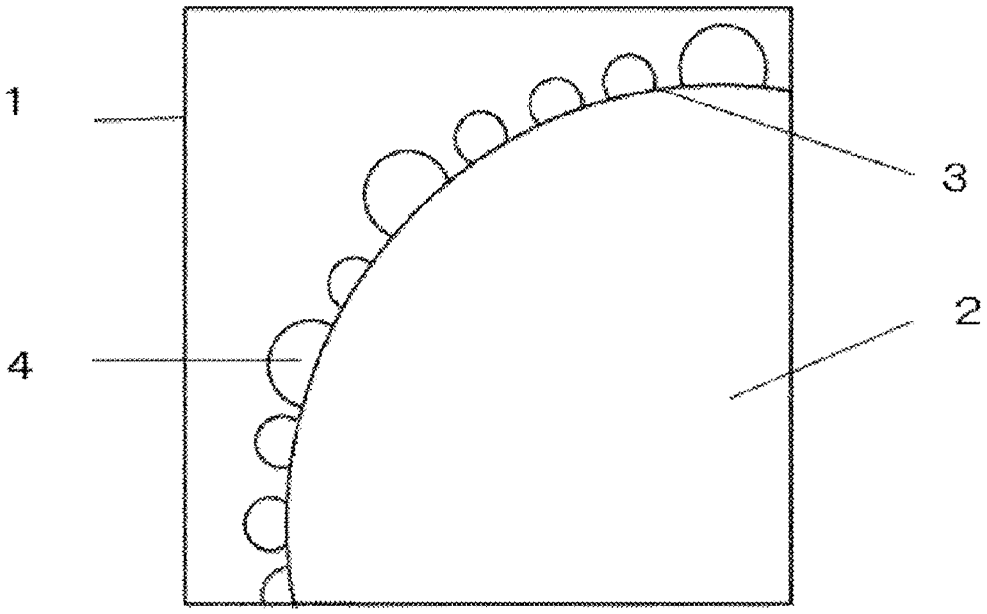
FIG. 2 is a schematic diagram of cross-sectional observation of toner by STEM.

An image with an image size of 1024×1024 pixels is acquired with a STEM probe size of 1 nm. The image is acquired by adjusting “Contrast” to 1425 and “Brightness” to 3750 on the “Detector Control” panel in the bright-field image and adjusting “Contrast” to 0.0, “Brightness” to 0.5, and "Gammma" to 1.00 on the "Image Control" panel. The image magnification is 100,000 times, and the image is acquired so as to fit in about ¼ to ½ of the cross-sectional circumference of one toner particle as shown in FIG. 2.

For the obtained image, image analysis is performed using image processing software (Image J (available from https://imagej.nih.gov/ij/)), and the protrusions containing the organosilicon polymer are measured. The image analysis is performed on 30 STEM images.

First, a line (reference line) along the circumference of the toner core particle is drawn with a line drawing tool ("Segmented line" on the "Straight" tab is selected). The portion where the protrusion of the organosilicon polymer is embedded in the toner core particle is assumed not to be embedded, and the lines are connected smoothly (to maintain the curvature of the toner core particle).

Based on that line, transformation into a horizontal image is performed ("Selection" on the "Edit" tab is selected, the "Line width" is changed to 500 pixels in "Properties", then "Selection" on the "Edit" tab is selected, and "Straightener" is performed).

Figure 3:
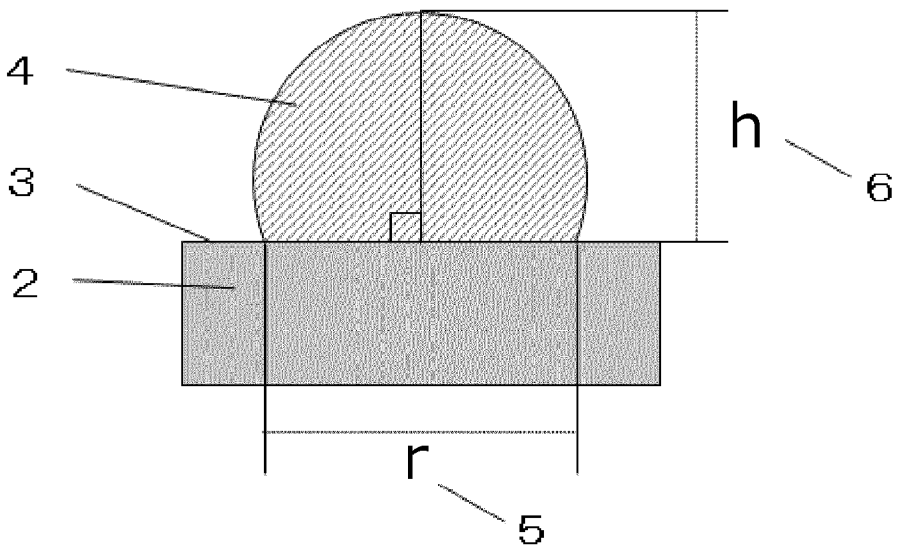
FIG. 3 is a schematic diagram showing how to measure the shape of protrusions on the toner.

The number-average width R is calculated as follows. FIGS. 2 and 3 show schematic diagrams of protrusions of toner particle.

Reference numeral 1 in FIG. 2 is an STEM image, in which about ¼ of the toner particle can be seen, 2 is the toner core particle, 3 is the toner core particle surface, and 4 is the protrusion. Further, in FIG. 3, 5 is the protrusion width r, and 6 is the protrusion height h.

First, the cross-sectional image of the toner is observed, and a line is drawn along the circumference of the toner core particle surface. Transformation into a horizontal image is performed based on the line (reference line) along the circumference. In the horizontal image, the length of the line (reference line) along the circumference at the portion where the protrusion and the toner core particle form a continuous interface is denoted by r (corresponds to the width of the protrusion on the reference line; also referred to as protrusion width r). In addition, the maximum length of the protrusion in the normal direction of the r is defined as the protrusion diameter d, and the length from the apex of the protrusion in the line segment forming the protrusion diameter d to the line along the circumference is defined as the protrusion height h. In FIG. 3, d and h are the same.

For the horizontal image, r is measured by the method described above for each protrusion containing the organosilicon polymer, and the number-average value of r is defined as R (number-average width R).

In order to measure the average height H of the protrusion more accurately, a value is used that was measured using the scanning probe microscope described hereinbelow, rather than from h.

The detailed measurement of the protrusion is as described above and shown in FIGS. 2 and 3.

The measurement is performed after superimposing "Straight Line" on the "Straight" tab in Image J and setting the length of the scale on the image with "Set Scale" on the "Analyze" tab. A line segment corresponding to the protrusion width r can be drawn with "Straight Line" on the "Straight" tab and measured with "Measure" on the "Analyze" tab.

Method for Measuring Average Height of Protrusions on Toner Particle Surface

E1 and E2 are derived by performing force curve measurements of the protrusions on the toner particle surface and of the toner core particle surface layer by using a scanning probe microscope (SPM) "AFM5500M" manufactured by Hitachi High-Tech Corporation. As a cantilever (hereinafter also referred to as a probe) used for measurement, "SI-DF3P2" marketed by Hitachi High-Tech Fielding Corp. is used.

The SPM used for measurement is calibrated in advance for positional accuracy in the XYZ directions, and the cantilever used for measurement is measured in advance for the tip curvature radius of the probe.

The tip curvature radius of the probe is measured using a probe evaluation sample "GBB-0079" marketed by Hitachi High-Tech Fielding Corp. The value of the tip curvature radius is selected so that the toner core particle surface layer can be measured without contacting the protrusions. In the present disclosure, 7 nm is used.

In the measurement of toner particles, first a conductive double-sided tape is attached to a sample stage, and toner particles are sprayed thereon. Excess toner particles are then removed from the sample stage by air blowing. The shape of this sample is measured with the SPM in the range of 1 μm×1 μm on the toner particle surface, and the protrusions on the toner particle surface are observed. Toner particles having a particle diameter equal to the weight-average particle diameter (D4) of the toner particles are selected to be measured.

After the measurement, the maximum surface height Sp is calculated after performing the tilt correction of the obtained 1 μm×1 μm measurement data. The tilt correction of the measurement data is performed by conducting curved surface correction on the measured data in the order of first-order curved surface correction, second-order curved surface correction, and third-order curved surface correction. The correction is performed using AFM5000II, which is analysis software provided with AFM5500M. In the present disclosure, the tilt correction of measurement data is performed by analysis processing in the order of first-order tilt correction (first-order curved surface correction), second-order tilt correction (second-order curved surface correction), and third-order tilt correction (third-order curved surface correction) in the analysis software.

Sp means the maximum height from the outermost surface of the toner core particle to the apex of the protrusion in 1 m×1 m. Sp can be calculated by referring to the Sp value displayed when the surface roughness analysis on the analysis tab of the analysis software is activated for the data subjected to tilt correction. When the obtained Sp is the height h1 (nm) of the protrusion, the heights h1 to h50 of the protrusions of 50 toner particles are obtained by the above method, and the arithmetic mean value of h1 to h50 is taken as the average height H (nm) of the protrusions.

Calculation of Coverage Ratio of Toner Particle Surface

<Method for Acquiring Backscattered Electron Image of Toner Particle Surface>

The coverage ratio of the toner particle surface with the organosilicon polymer is calculated using a backscattered electron image of the toner particle surface.

The backscattered electron image of the toner particle surface is obtained with a scanning electron microscope (SEM).

A backscattered electron image obtained from a SEM is also called a "compositional image", and the smaller the atomic number, the darker image is detected, and the higher the atomic number, the brighter image is detected.

A toner particle is generally a resin particle that mainly contains composition including a resin component and carbon of a release agent or the like as main components. When an organosilicon polymer is present on the toner particle surface, the organosilicon polymer is observed as a bright portion and the toner core particle surface is observed as a dark portion in a backscattered electron image obtained by SEM.

The SEM device and observation conditions are as follows.

Device used: ULTRA PLUS manufactured by Carl Zeiss Microscopy Co., Ltd.

Accelerating voltage: 1.0 kV

WD: 2.0 mm

Aperture size: 30.0 m

Detection signal: EsB (energy selective backscattered electron)

EsB Grid: 800 V

Observation magnification: 50,000 times.

Contrast: 63.0±5.0% (reference value)

Brightness: 38.0±5.0% (reference value)

Image size: 1024×768 pixels

Pretreatment: toner particles are sprayed on carbon tape (no vapor deposition)

Contrast and brightness are set, as appropriate, according to the state of the device used. Also, the acceleration voltage and EsB Grid are set so as to achieve items such as acquisition of structural information on the outermost surface of toner particle, prevention of charge-up of the non-vapor-deposited sample, and selective detection of high-energy backscattered electrons. The observation field is selected near the vertex where the curvature of the toner particle is the smallest.

<Method for Confirming that Bright Portion in Backscattered Electron Image is Derived from Organosilicon Polymer>

The fact that the bright portion in the observed backscattered electron image is derived from the organosilicon polymer is confirmed by superimposing an elemental mapping image obtained by energy dispersive X-ray analysis (EDS) that can be acquired with a scanning electron microscope (SEM) and the backscattered electron image.

The SEM/EDS device and observation conditions are as follows.

Device used (SEM): ULTRA PLUS manufactured by Carl Zeiss Microscopy Co., Ltd.

Device used (EDS): NORAN System 7, Ultra Dry EDS Detector manufactured by Thermo Fisher Scientific Inc.

Accelerating voltage: 5.0 kV

WD: 7.0 mm

Aperture size: 30.0 m

Detection signal: SE2 (secondary electron)

Observation magnification: 50,000 times

Mode: Spectral Imaging

Pretreatment: spraying of toner particles on carbon tape and platinum sputtering The mapping image of the silicon element obtained by this method is superimposed on the backscattered electron image, and it is confirmed that the silicon atom portion of the mapping image and the bright portion of the backscattered electron image match. A portion where the silicon atom portion of the mapping image and the bright portion of the backscattered electron image match is defined as the organosilicon polymer. As a result, it can be confirmed that the toner particle contains the organosilicon polymer on the surface of the toner core particle.

The locations where external additives such as silica are embedded in the toner particle, which are observed by a scanning electron microscope (SEM) or scanning transmission electron microscope (STEM), are excluded from measurement.

<Method for Measuring Coverage Ratio of Toner Particle Surface by Organosilicon Polymer>

The coverage ratio is calculated based on a non-covered portion domain D1, which is not covered with the organosilicon polymer, and a covered portion domain D2, which is covered with the organosilicon polymer. Domains D1 and D2 are analyzed by using image processing software ImageJ (developed by Wayne Rashand) on the backscattered electron image of the outermost surface of the toner particle obtained by the above method. The procedure is described below.

First, from "Type" in the "Image" menu, the backscattered electron image to be analyzed is converted to 8-bit. Next, from "Filters" in the "Process" menu, the "Median" diameter is set to 2.0 pixels to reduce image noise. The image center is estimated after excluding the observation condition display area displayed at the bottom of the backscattered electron image, and a 1.5 m square range is selected from the image center of the backscattered electron image using the "Rectangle Tool" on the toolbar.

Next, "Threshold" is selected from "Adjust" on the "Image" menu. "Default" is selected and "Apply" is clicked to obtain a binarized image.

By this operation, the pixels corresponding to the non-covered portion domain D1 (toner core particle) are displayed in black (pixel group A1), and the pixels corresponding to the covered portion domain D2 (organosilicon polymer) are displayed in white (pixel group A2).

After excluding the observation condition display area, which is displayed at the bottom of the backscattered electron image, the image center is estimated again, and the "Rectangle Tool" on the toolbar is used to select a 1.5 m square range from the image center of the backscattered electron image.

Next, using the straight line tool ("Straight Line") on the toolbar, the scale bar in the observation condition display area, which is displayed at the bottom of the backscattered electron image, is selected. Where "Set Scale" is selected from the "Analyze" menu in that state, a new window opens, and the pixel distance of the selected straight line is entered in the "Distance in Pixels" column.

The scale bar value (for example, 100) is entered in the "Known Distance" column of the window, the scale bar unit (for example, nm) is input in the "Unit of Measurement" column, and where OK is clicked, the scale setting is completed.

Next, "Set Measurements" is selected from the "Analyze" menu and the "Area" and "Feret's diameter" are checked. "Analyze Particles" is selected from the "Analyze" menu, the "Display Result" is checked, and where OK is clicked, the domain analysis is performed.

From the newly opened "Results" window, the area ("Area") for each domain corresponding to the non-covered portion domain D1 formed by the pixel group A1 and the covered portion domain D2 formed by the pixel group A2 is acquired.

The total area of the non-covered portion domain D1 is denoted by Si ($m^2$), and the total area of the covered portion domain D2 is denoted by S2 ($m^2$). The coverage ratio S is calculated from the obtained S1 and S2 by the following formula.

$$S(\%\text{ by area}) = \{S2/(S1+S2)\}\times 100.$$

The above procedure is performed for 10 fields of view for the toner particles to be evaluated, and the arithmetic mean value is used as the coverage ratio.

EXAMPLES

The present invention will be specifically described by the production examples and examples shown below. However, these do not limit the present invention at all. In addition, all "parts" and "%" in the following prescriptions are based on mass unless otherwise specified.

Production of Low-Molecular-Weight Resin (1)

A total of 600.0 parts of xylene was put into a reactor equipped with a dropping funnel, a Liebig condenser and a stirrer, and the temperature was raised to 135° C. A mixture of 100.0 parts of styrene monomer, 0.1 parts of n-butyl acrylate and 13.0 parts of di-tert-butyl peroxide was loaded into the dropping funnel and added dropwise to xylene at 135° C. over 2 h.

Further, solution polymerization was completed under reflux of xylene (137° C. to 145° C.), xylene was removed, and low-molecular-weight resin (1) was obtained. The obtained low-molecular-weight resin (1) had a weight-average molecular weight (Mw) of 3200 and a glass transition point (Tg) of 55° C.

Production of Low-Molecular-Weight Resins (2) to (5)

Low-molecular-weight resins (2) to (5) were obtained in the same manner as in the production example of low-molecular-weight resin (1), except that the production conditions in the production example of low-molecular-weight resin (1) are changed as shown in Table 1. The sign "-" in Table 1 means "not added".

TABLE 1

| | | | Low-molecular-weight resin No. | | | | |
|---|---|---|---|---|---|---|---|
| | | | (1) | (2) | (3) | (4) | (5) |
| Composition ratio | Styrene monomer | Amount added (parts) | 100.0 | 100.0 | 100.0 | 100.0 | 93.0 |
| | n-Butyl acrylate | Amount added (parts) | 0.1 | — | — | — | 7.0 |
| | Di-tert-butyl peroxide | Amount added (parts) | 13.0 | 10.0 | 12.0 | 16.0 | 12.5 |
| Weight-average molecular weight Mw | | | 3200 | 4800 | 4000 | 2300 | 3300 |
| Glass transition point (° C.) | | | 55 | 59 | 58 | 54 | 46 |

The weight-average molecular weight is the weight-average molecular weight Mw of the THF-soluble matter determined by GPC.

Production Example of Toner Core Particle Dispersion Liquid

Preparation of Toner Core Particle Dispersion Liquid 1

A total of 11.2 parts of sodium phosphate (12-hydrate) was added to a reaction vessel containing 390.0 parts of ion-exchanged water, and the temperature was kept at 65° C. for 1.0 h while purging the reaction vessel with nitrogen. Stirring was performed at 12000 rpm using a T. K. Homomixer (manufactured by Tokushu Kika Kogyo Co., Ltd.). While maintaining stirring, a calcium chloride aqueous solution prepared by dissolving 7.4 parts of calcium chloride (dihydrate) in 10.0 parts of ion-exchanged water was all put into the reaction vessel to prepare an aqueous medium including a dispersion stabilizer. Furthermore, 1.0 mol/L of hydrochloric acid was added to the aqueous medium in the reaction vessel to adjust the pH to 6.0, thereby preparing an aqueous medium 1.

| Preparation of Polymerizable Monomer Composition 1 | |
|---|---|
| Styrene | 60.0 parts |
| C.I. Pigment Blue 15:3 | 6.3 parts |

The above materials were put into an attritor (manufactured by Nippon Coke Kogyo Co., Ltd.), and further dispersed using zirconia particles with a diameter of 1.7 mm at 220 rpm for 5.0 h to prepare a colorant dispersion liquid 1 in which the pigment was dispersed.

Then, the following materials were added to the colorant dispersion liquid 1.

| | |
|---|---|
| Styrene | 16.0 parts |
| n-Butyl acrylate | 18.0 parts |
| Lauryl acrylate | 6.0 parts |
| 1,6-Hexanediol diacrylate | 0.5 parts |
| Polyester resin (Condensation product of terephthalic acid and 2 mol propylene oxide adduct of bisphenol A, weight average molecular weight Mw = 10000, acid value: 8.2 mg KOH/g) | 4.0 parts |
| Low-molecular-weight resin (1) | 12.0 parts |
| Ethylene glycol distearate | 15.0 parts |

The above materials were kept at 65° C. and uniformly dissolved and dispersed at 500 rpm by using T. K. Homomixer to prepare a polymerizable monomer composition 1.

Granulation Step

While maintaining the temperature of the aqueous medium 1 at 70° C. and the rotation speed of the stirring device at 12500 rpm, the polymerizable monomer composition 1 was added to the aqueous medium 1, and 9.0 parts of t-butyl peroxypivalate (t-BPV) was added as a polymerization initiator. The mixture was granulated for 10 min while maintaining 12500 rpm with the stirring device.

Polymerization Step A

The high-speed stirring device was changed to a stirrer equipped with propeller stirring blades, and polymerization was carried out for 5.0 h while stirring at 200 rpm and keeping the temperature at 70° C.

Polymerization Step B

Continuously from the polymerization step A, the temperature was further raised to 85° C. and the polymerization reaction was performed by heating for 2.0 h. Further, 0.03 parts of 3-methacryloxypropyltrimethoxysilane was added and stirred for 5 min, and then a 1 mol/L sodium hydroxide aqueous solution was added to adjust the pH to 9.0. Further, the temperature was raised to 98° C. and heating was performed for 3.0 h to remove residual monomers. After that, the temperature was lowered to 25° C. Ion-exchanged water was added to adjust the concentration of the toner particles in the dispersion liquid to 20.0%, and a toner core particle dispersion liquid 1 in which the toner core particles 1 were dispersed was obtained.

Preparation of Toner Core Particle Dispersions 2 to 41

Toner core particle dispersions 2 to 41 were obtained in the same manner as in the preparation of toner core particle dispersion 1, except that the number of parts and production conditions were changed as shown in Table 2. As the Si-containing monomers in Table 2, the compounds listed in Table 3 were used.

TABLE 2

| Toner core particle | St | BA | Acrylic acid alkyl ester other than BA | | Ester wax | | Initiator (t-BPV) | Resin B | | Si-containing monomer | | RT |
|---|---|---|---|---|---|---|---|---|---|---|---|---|
| No. | Parts | Parts | Type | Parts | Type | Parts | Parts | Type | Parts | No. | Parts | ° C. |
| 1 | 76.0 | 18.0 | LA | 6.0 | EGDS | 15.0 | 9.0 | Resin (1) | 12.0 | (1) | 0.03 | 70 |
| 2 | 76.0 | 18.0 | SA | 6.0 | EGDS | 15.0 | 9.0 | Resin (1) | 12.0 | (1) | 0.03 | 70 |
| 3 | 76.0 | 18.0 | BEA | 6.0 | EGDS | 15.0 | 12.0 | Resin (1) | 12.0 | (1) | 0.03 | 70 |
| 4 | 76.0 | 18.0 | DA | 6.0 | EGDS | 15.0 | 8.0 | Resin (1) | 12.0 | (1) | 0.03 | 70 |
| 5 | 76.0 | 18.0 | LA | 6.0 | EGDM | 15.0 | 9.0 | Resin (1) | 12.0 | (1) | 0.03 | 70 |
| 6 | 76.0 | 18.0 | LA | 6.0 | HDM | 15.0 | 9.0 | Resin (1) | 12.0 | (1) | 0.03 | 70 |
| 7 | 76.0 | 18.0 | LA | 6.0 | HDB | 15.0 | 9.0 | Resin (1) | 12.0 | (1) | 0.03 | 70 |
| 8 | 76.0 | 18.0 | LA | 6.0 | EGDS | 10.0 | 9.0 | Resin (1) | 12.0 | (1) | 0.03 | 70 |
| 9 | 76.0 | 18.0 | LA | 6.0 | EGDS | 25.0 | 9.0 | Resin (1) | 12.0 | (1) | 0.03 | 70 |
| 10 | 45.0 | 35.0 | LA | 20.0 | EGDS | 15.0 | 9.0 | Resin (1) | 12.0 | (1) | 0.03 | 70 |
| 11 | 60.0 | 25.0 | LA | 15.0 | EGDS | 15.0 | 9.0 | Resin (1) | 12.0 | (1) | 0.03 | 70 |
| 12 | 80.0 | 10.0 | LA | 10.0 | EGDS | 15.0 | 9.0 | Resin (1) | 12.0 | (1) | 0.03 | 70 |
| 13 | 85.0 | 10.0 | LA | 5.0 | EGDS | 15.0 | 9.0 | Resin (1) | 12.0 | (1) | 0.03 | 70 |
| 14 | 76.0 | 18.0 | LA | 6.0 | EGDS | 15.0 | 9.0 | Resin (2) | 12.0 | (1) | 0.03 | 70 |
| 15 | 76.0 | 18.0 | LA | 6.0 | EGDS | 15.0 | 9.0 | Resin (3) | 12.0 | (1) | 0.03 | 70 |
| 16 | 76.0 | 18.0 | LA | 6.0 | EGDS | 15.0 | 9.0 | Resin (4) | 12.0 | (1) | 0.03 | 70 |
| 17 | 76.0 | 18.0 | LA | 6.0 | EGDS | 15.0 | 9.0 | Resin (5) | 12.0 | (1) | 0.03 | 70 |
| 18 | 76.0 | 18.0 | LA | 6.0 | EGDS | 15.0 | 9.0 | Resin (1) | 4.00 | (1) | 0.03 | 70 |
| 19 | 76.0 | 18.0 | LA | 6.0 | EGDS | 15.0 | 9.0 | Resin (1) | 5.5 | (1) | 0.03 | 70 |
| 20 | 76.0 | 18.0 | LA | 6.0 | EGDS | 15.0 | 9.0 | Resin (1) | 8.0 | (1) | 0.03 | 70 |
| 21 | 76.0 | 18.0 | LA | 6.0 | EGDS | 15.0 | 9.0 | Resin (1) | 16.0 | (1) | 0.03 | 70 |
| 22 | 76.0 | 18.0 | LA | 6.0 | EGDS | 15.0 | 9.0 | Resin (1) | 20.0 | (1) | 0.03 | 70 |
| 23 | 76.0 | 18.0 | LA | 6.0 | EGDS | 15.0 | 9.0 | Resin (1) | 30.0 | (1) | 0.03 | 70 |
| 24 | 76.0 | 18.0 | LA | 6.0 | EGDS | 15.0 | 20.0 | Resin (1) | 12.0 | (1) | 0.03 | 80 |
| 25 | 76.0 | 18.0 | LA | 6.0 | EGDS | 15.0 | 7.0 | Resin (1) | 12.0 | (1) | 0.03 | 65 |
| 26 | 76.0 | 18.0 | LA | 6.0 | EGDS | 15.0 | 9.0 | Resin (1) | 12.0 | — | 0.00 | 70 |
| 27 | 76.0 | 18.0 | LA | 6.0 | EGDS | 15.0 | 9.0 | Resin (1) | 12.0 | (1) | 0.01 | 70 |
| 28 | 76.0 | 18.0 | LA | 6.0 | EGDS | 15.0 | 9.0 | Resin (1) | 12.0 | (1) | 1.0 | 70 |
| 29 | 76.0 | 18.0 | LA | 6.0 | EGDS | 15.0 | 9.0 | Resin (1) | 12.0 | (2) | 0.03 | 70 |
| 30 | 76.0 | 18.0 | LA | 6.0 | EGDS | 15.0 | 9.0 | Resin (1) | 12.0 | (3) | 0.03 | 70 |
| 31 | 76.0 | 18.0 | LA | 6.0 | EGDS | 15.0 | 9.0 | Resin (1) | 12.0 | (4) | 0.03 | 70 |
| 32 | 76.0 | 18.0 | LA | 6.0 | EGDS | 15.0 | 9.0 | Resin (1) | 12.0 | (1) | 1.5 | 70 |
| 33 | 76.0 | 18.0 | LA | 6.0 | EGDS | 15.0 | 9.0 | Resin (1) | 12.0 | (1) | 7.0 | 70 |
| 34 | 76.0 | 18.0 | LA | 6.0 | HNP51 | 15.0 | 9.0 | Resin (1) | 12.0 | (1) | 0.03 | 70 |
| 35 | 76.0 | 18.0 | n-OA | 6.0 | EGDS | 15.0 | 9.0 | Resin (1) | 12.0 | (1) | 0.03 | 70 |
| 36 | 76.0 | 18.0 | LA | 6.0 | EGDS | 15.0 | 9.0 | — | — | (1) | 0.03 | 70 |
| 37 | 80.0 | 18.0 | — | 0.0 | EGDS | 15.0 | 9.0 | — | — | — | 0.00 | 70 |
| 38 | 76.0 | 18.0 | — | 0.0 | EGDS | 15.0 | 9.0 | — | — | — | 0.00 | 70 |
| 39 | 72.0 | 18.0 | SA | 10.0 | EGDS | 15.0 | 9.0 | Resin (1) | 6.5 | — | 0.00 | 70 |
| 40 | 80.0 | 20.0 | — | 0.0 | EGDS | 15.0 | 7.0 | — | — | — | 0.00 | 65 |
| 41 | 30.0 | 64.0 | DA | 6.0 | EGDS | 15.0 | 20.0 | Resin (1) | 6.5 | — | 0.00 | 80 |

In the table, St indicates styrene and BA indicates n-butyl acrylate.

In the column of "Acrylic acid alkyl ester other than BA", LA indicates Lauryl acrylate, SA indicates Stearyl acrylate, BEA indicates Behenyl acrylate, DA indicates Dotriacontyl acrylate and n-OA indicates n-Octyl acrylate.

In the column of "Ester wax", EGDS indicates Ethylene glycol distearate, EGDM indicates Ethylene glycol dimyristate, HDM indicates 1,6-Hexanediol dimyristate, HDB indicates 1,6-Hexanediol dibehenate and HNP51 indicates Hydrocarbon wax (HNP51, manufactured by Nippon Seiro Co., Ltd.).

The type of resin B indicates the number of the low-molecular-weight resin in Table 1. RT indicates Reaction temperature.

TABLE 3

| Si-segment-containing monomer | Silane compound starting material |
|---|---|
| (1) | 3-methacryloxypropyltrimethoxysilane |
| (2) | 3-methacryloxypropylmethyldimethoxysilane |

TABLE 3-continued

| Si-segment-containing monomer | Silane compound starting material |
|---|---|
| (3) | 3-methacryloxyoctyltrimethoxysilane |
| (4) | 3-methacryloxypropyltriethoxysilane |

Preparation of Monomer Hydrolysate 1

A mixture of 60 parts of ion-exchanged water adjusted to pH=4.0 by adding 1 mol/L hydrochloric acid and 40 parts of methyltrimethoxysilane was mixed using a stirrer until a uniform phase was obtained, thereby obtaining a monomer hydrolysate 1.

Preparation of Monomer Hydrolysate 2

A mixture of 60 parts of ion-exchanged water adjusted to pH=1.5 by adding 1 mol/L hydrochloric acid and 40 parts of methyltrimethoxysilane was mixed using a stirrer until a uniform phase was obtained, thereby obtaining a monomer hydrolysate 2.

Production Example of Toner Particles 1

The following sample was weighed into a reaction vessel, and the temperature of the solution was brought to 55° C. while stirring using a propeller stirring blade.

| | |
|---|---|
| Toner core particle dispersion liquid 1 | 500.0 parts |

Next, the pH of the resulting mixture was adjusted to 8.0, 20.0 parts of the monomer hydrolysate 1 was added while mixing using a propeller stirring blade, and sitting was maintained for 10 min (step I). After that, a 1 mol/L sodium hydroxide aqueous solution was added to adjust the pH to 11.0, and the mixture was held for 3 h while maintaining stirring (step II).

After adjusting the pH to 1.5 with 1 mol/L hydrochloric acid and stirring for 1 h, filtration and drying were performed while washing with ion-exchanged water. The obtained finely pulverized powder was classified using a multi-division classifier utilizing the Coanda effect, and toner particles 1 having a number-average particle diameter (D1) of 6.6 m and a weight-average particle diameter (D4) of 6.9 m were obtained.

Production Examples of Toner Particles 2 to 43 and 46

Toner particles 2 to 43 and 46 were obtained in the same manner as in the production example of toner particles 1, except that the production conditions in the production example of toner particles 1 were changed as shown in Table 4. The toner particles 2 to 43 and 46 were classified by a multi-division classifier so as to have a number-average particle diameter (D1) of 6.6 m and a weight-average particle diameter (D4) of 6.9 m.

Production Examples of Toners 1 to 43 and 46

Toner particles 1 to 43 and 46 were used, as they were, as toners 1 to 43 and 46. Table 5-1 and Table 5-2 shows the physical properties of the obtained toners.

Production Example of Toner 44

The toner core particle dispersion liquid 38 was placed in a reaction vessel, the pH was adjusted to 1.5 with 1 mol/L hydrochloric acid, and after stirring for 1.0 h, filtration was performed while washing with ion-exchange water to obtain toner particles 44. The toner particles 44 were classified with a multi-division classifier so as to have a number-average particle diameter (D1) of 6.6 m and a weight-average particle diameter (D4) of 6.9 m.

A total of 0.3 parts of hydrophobic titanium oxide (average primary particle diameter: 35 nm) was added to 100.0 parts of toner particles 44 obtained, and mixing was performed with an FM mixer (manufactured by Nippon Coke Kogyo Co., Ltd.). Further, 1.5 parts of hydrophobic silica (number-average particle diameter of primary particles: 40 nm) was added and mixed with an FM mixer to obtain toner 44 to which an external additive was added. Table 5-1 and Table 5-2 shows the physical properties of the obtained toner.

Production Examples of Toners 45 and 47

A toner 45 was obtained in the same manner as in the production example of toner 44, except that the toner core particle dispersion liquid 38 was changed to the toner core particle dispersion liquid 39 in the production example of toner 44.

A toner 47 was obtained in the same manner as in the production example of toner 44, except that the toner core particle dispersion liquid 38 was changed to the toner core particle dispersion liquid 41 in the production example of toner 44.

Table 5-1 and Table 5-2 shows the physical properties of the obtained toners.

TABLE 4

| | | | Step I | | | Step I I | |
|---|---|---|---|---|---|---|---|
| Toner No. | Toner core article No. | Hydrolysate No. | pH | Amount of hydrolysate added (parts) | Time (min) | pH | Time (min) |
| 1 | 1 | 1 | 8.0 | 20 | 10 | 11.0 | 180 |
| 2 | 2 | 1 | 8.0 | 20 | 10 | 11.0 | 180 |
| 3 | 3 | 1 | 8.0 | 20 | 10 | 11.0 | 180 |
| 4 | 4 | 1 | 8.0 | 20 | 10 | 11.0 | 180 |
| 5 | 5 | 1 | 8.0 | 20 | 10 | 11.0 | 180 |
| 6 | 6 | 1 | 8.0 | 20 | 10 | 11.0 | 180 |
| 7 | 7 | 1 | 8.0 | 20 | 10 | 11.0 | 180 |
| 8 | 8 | 1 | 8.0 | 20 | 10 | 11.0 | 180 |
| 9 | 9 | 1 | 8.0 | 20 | 10 | 11.0 | 180 |
| 10 | 10 | 1 | 8.0 | 20 | 10 | 11.0 | 180 |
| 11 | 11 | 1 | 8.0 | 20 | 10 | 11.0 | 180 |
| 12 | 12 | 1 | 8.0 | 20 | 10 | 11.0 | 180 |
| 13 | 13 | 1 | 8.0 | 20 | 10 | 11.0 | 180 |
| 14 | 14 | 1 | 8.0 | 20 | 10 | 11.0 | 180 |
| 15 | 15 | 1 | 8.0 | 20 | 10 | 11.0 | 180 |
| 16 | 16 | 1 | 8.0 | 20 | 10 | 11.0 | 180 |
| 17 | 17 | 1 | 8.0 | 20 | 10 | 11.0 | 180 |
| 18 | 18 | 1 | 8.0 | 20 | 10 | 11.0 | 180 |
| 19 | 19 | 1 | 8.0 | 20 | 10 | 11.0 | 180 |
| 20 | 20 | 1 | 8.0 | 20 | 10 | 11.0 | 180 |
| 21 | 21 | 1 | 8.0 | 20 | 10 | 11.0 | 180 |
| 22 | 22 | 1 | 8.0 | 20 | 10 | 11.0 | 180 |
| 23 | 23 | 1 | 8.0 | 20 | 10 | 11.0 | 180 |
| 24 | 24 | 1 | 8.0 | 20 | 10 | 11.0 | 180 |
| 25 | 25 | 1 | 8.0 | 20 | 10 | 11.0 | 180 |
| 26 | 26 | 1 | 5.5 | 20 | 60 | 9.5 | 240 |
| 27 | 27 | 1 | 8.0 | 20 | 10 | 11.0 | 180 |
| 28 | 28 | 1 | 9.0 | 20 | 10 | 11.0 | 180 |
| 29 | 26 | 1 | 5.5 | 15 | 60 | 9.5 | 240 |
| 30 | 1 | 1 | 8.0 | 16 | 10 | 11.0 | 180 |
| 31 | 1 | 1 | 8.5 | 30 | 10 | 11.0 | 180 |
| 32 | 1 | 1 | 8.5 | 40 | 10 | 11.0 | 180 |
| 33 | 1 | 1 | 9.0 | 20 | 10 | 11.0 | 60 |
| 34 | 28 | 2 | 5.5 | 20 | 30 | 9.5 | 240 |
| 35 | 29 | 1 | 8.0 | 20 | 10 | 11.0 | 180 |
| 36 | 30 | 1 | 8.0 | 20 | 10 | 11.0 | 180 |
| 37 | 31 | 1 | 8.0 | 20 | 10 | 11.0 | 180 |
| 38 | 32 | 1 | 9.5 | 25 | 10 | 11.0 | 180 |
| 39 | 33 | 1 | 9.5 | 25 | 10 | 11.0 | 180 |
| 40 | 34 | 1 | 8.0 | 20 | 10 | 11.0 | 180 |
| 41 | 35 | 1 | 8.0 | 20 | 10 | 11.0 | 180 |
| 42 | 36 | 1 | 8.0 | 20 | 10 | 11.0 | 180 |
| 43 | 37 | 1 | 5.0 | 20 | 30 | 9.0 | 300 |
| 44 | 38 | — | — | — | — | — | — |
| 45 | 39 | — | — | — | — | — | — |

TABLE 4-continued

| Toner No. | Toner core article No. | Hydrolysate No. | Step I pH | Step I Amount of hydrolysate added (parts) | Step I Time (min) | Step I I pH | Step I I Time (min) |
|---|---|---|---|---|---|---|---|
| 46 | 40 | 1 | 8.0 | 20 | 30 | 11.0 | 240 |
| 47 | 41 | — | — | — | — | — | — |

Examples 1 to 39, Comparative Examples 1 to 8

Using the toners 1 to 47, the evaluations were performed in the combinations shown in Table 6. Table 6 shows the evaluation results.

TABLE 5-1

| Example No. | Toner No. | X30 | X45 | \|SP(M1)-SP(W)\| | Amount of M2 (% by mass) | Mw of resin A | M p |
|---|---|---|---|---|---|---|---|
| 1 | 1 | 262 | 852 | 0.61 | 76.0 | 396000 | 18000 |
| 2 | 2 | 243 | 803 | 0.29 | 76.0 | 380000 | 18000 |
| 3 | 3 | 250 | 789 | 0.15 | 76.0 | 100000 | 14000 |
| 4 | 4 | 233 | 795 | 0.05 | 76.0 | 440000 | 22000 |
| 5 | 5 | 268 | 860 | 0.46 | 76.0 | 402000 | 18000 |
| 6 | 6 | 285 | 892 | 0.54 | 76.0 | 403000 | 17000 |
| 7 | 7 | 246 | 792 | 0.74 | 76.0 | 397000 | 18000 |
| 8 | 8 | 178 | 518 | 0.61 | 76.0 | 399000 | 18000 |
| 9 | 9 | 278 | 941 | 0.61 | 76.0 | 398000 | 18000 |
| 10 | 10 | 300 | 950 | 0.61 | 45.0 | 420000 | 19000 |
| 11 | 11 | 280 | 882 | 0.61 | 60.0 | 414000 | 18000 |
| 12 | 12 | 231 | 745 | 0.61 | 80.0 | 407000 | 18000 |
| 13 | 13 | 180 | 400 | 0.61 | 85.0 | 403000 | 17000 |
| 14 | 14 | 198 | 772 | 0.61 | 76.0 | 402000 | 18000 |
| 15 | 15 | 250 | 801 | 0.61 | 76.0 | 404000 | 18000 |
| 16 | 16 | 270 | 900 | 0.61 | 76.0 | 396000 | 17000 |
| 17 | 17 | 269 | 848 | 0.61 | 76.0 | 401000 | 18000 |
| 18 | 18 | 176 | 405 | 0.61 | 76.0 | 397000 | 18000 |
| 19 | 19 | 205 | 412 | 0.61 | 76.0 | 401000 | 19000 |
| 20 | 20 | 236 | 596 | 0.61 | 76.0 | 403000 | 18000 |
| 21 | 21 | 263 | 922 | 0.61 | 76.0 | 397000 | 18000 |
| 22 | 22 | 295 | 940 | 0.61 | 76.0 | 396000 | 18000 |
| 23 | 23 | 298 | 992 | 0.61 | 76.0 | 402000 | 18000 |
| 24 | 24 | 288 | 996 | 0.61 | 76.0 | 80000 | 12000 |
| 25 | 25 | 163 | 400 | 0.61 | 76.0 | 500000 | 25000 |
| 26 | 26 | 215 | 418 | 0.61 | 76.0 | 380000 | 18000 |
| 27 | 27 | 221 | 846 | 0.61 | 76.0 | 380000 | 18000 |
| 28 | 28 | 198 | 602 | 0.61 | 76.0 | 380000 | 18000 |
| 29 | 29 | 211 | 412 | 0.61 | 76.0 | 380000 | 18000 |
| 30 | 30 | 248 | 423 | 0.61 | 76.0 | 380000 | 18000 |
| 31 | 31 | 247 | 582 | 0.61 | 76.0 | 380000 | 18000 |
| 32 | 32 | 253 | 492 | 0.61 | 76.0 | 380000 | 18000 |
| 33 | 33 | 298 | 982 | 0.61 | 76.0 | 380000 | 18000 |
| 34 | 34 | 161 | 400 | 0.61 | 76.0 | 380000 | 18000 |
| 35 | 35 | 254 | 834 | 0.61 | 76.0 | 398000 | 18000 |
| 36 | 36 | 260 | 847 | 0.61 | 76.0 | 400000 | 18000 |
| 37 | 37 | 253 | 838 | 0.61 | 76.0 | 380000 | 18000 |
| 38 | 38 | 191 | 534 | 0.61 | 76.0 | 380000 | 18000 |
| 39 | 39 | 182 | 403 | 0.61 | 76.0 | 380000 | 18000 |
| C.E 1 | 40 | 92 | 170 | 0.61 | 76.0 | 380000 | 18000 |
| C.E 2 | 41 | 65 | 234 | 1.02 | 76.0 | 400000 | 18000 |
| C.E 3 | 42 | 193 | 216 | 0.61 | 76.0 | 396000 | 18000 |
| C.E 4 | 43 | 52 | 150 | — | 80.0 | 406000 | 19000 |
| C.E 5 | 44 | 228 | 234 | — | 76.0 | 392000 | 17000 |
| C.E 6 | 45 | 145 | 197 | 0.29 | 72.0 | 401000 | 18000 |
| C.E 7 | 46 | 24 | 120 | — | 85.0 | 500000 | 25000 |
| C.E 8 | 47 | 324 | 1103 | 0.05 | 30.0 | 80000 | 12000 |

TABLE 5-2

| Example No. | Toner No. | Amount of resin B (% by mass) | L (% by mass) | Number-average width R (nm) | Average height H (nm) | R/H | Coverage ratio (%) | Formula (4) (%) |
|---|---|---|---|---|---|---|---|---|
| 1 | 1 | 7.4 | 11.8 | 110 | 35 | 3.1 | 48 | 0.02 |
| 2 | 2 | 7.4 | 11.8 | 110 | 32 | 3.4 | 47 | 0.02 |
| 3 | 3 | 7.4 | 11.8 | 110 | 33 | 3.3 | 49 | 0.02 |
| 4 | 4 | 7.4 | 11.8 | 110 | 34 | 3.2 | 48 | 0.02 |
| 5 | 5 | 7.4 | 11.8 | 110 | 35 | 3.1 | 48 | 0.02 |
| 6 | 6 | 7.4 | 11.8 | 110 | 33 | 3.3 | 49 | 0.02 |
| 7 | 7 | 7.4 | 11.8 | 110 | 32 | 3.4 | 50 | 0.02 |
| 8 | 8 | 7.4 | 11.8 | 110 | 36 | 3.1 | 48 | 0.02 |
| 9 | 9 | 7.4 | 11.8 | 110 | 34 | 3.2 | 49 | 0.02 |
| 10 | 10 | 7.4 | 9.6 | 110 | 33 | 3.3 | 47 | 0.02 |
| 11 | 11 | 7.4 | 10.1 | 110 | 34 | 3.2 | 48 | 0.02 |
| 12 | 12 | 7.4 | 10.9 | 110 | 35 | 3.1 | 49 | 0.02 |
| 13 | 13 | 7.4 | 11.2 | 110 | 32 | 3.4 | 50 | 0.02 |
| 14 | 14 | 7.4 | 11.8 | 110 | 34 | 3.2 | 47 | 0.02 |
| 15 | 15 | 7.4 | 11.8 | 110 | 33 | 3.3 | 49 | 0.02 |
| 16 | 16 | 7.4 | 11.8 | 110 | 35 | 3.1 | 48 | 0.02 |
| 17 | 17 | 7.4 | 11.8 | 110 | 33 | 3.3 | 48 | 0.02 |
| 18 | 18 | 2.6 | 7.8 | 110 | 35 | 3.1 | 49 | 0.02 |
| 19 | 19 | 3.0 | 8.1 | 110 | 34 | 3.2 | 50 | 0.02 |
| 20 | 20 | 5.0 | 9.8 | 110 | 32 | 3.4 | 47 | 0.02 |
| 21 | 21 | 10.0 | 14.0 | 110 | 33 | 3.3 | 48 | 0.02 |
| 22 | 22 | 12.0 | 15.0 | 110 | 34 | 3.2 | 49 | 0.02 |
| 23 | 23 | 14.3 | 17.0 | 110 | 35 | 3.1 | 47 | 0.02 |
| 24 | 24 | 7.4 | 48.0 | 110 | 33 | 3.3 | 48 | 0.02 |
| 25 | 25 | 7.4 | 8.3 | 110 | 35 | 3.1 | 49 | 0.02 |
| 26 | 26 | 7.4 | 11.8 | 45 | 43 | 1.0 | 56 | 0.00 |
| 27 | 27 | 7.4 | 11.8 | 80 | 41 | 2.0 | 49 | 0.01 |
| 28 | 28 | 7.4 | 11.8 | 135 | 37 | 3.6 | 52 | 0.80 |
| 29 | 29 | 7.4 | 11.8 | 75 | 20 | 3.8 | 56 | 0.00 |
| 30 | 30 | 7.4 | 11.8 | 90 | 25 | 3.6 | 49 | 0.02 |
| 31 | 31 | 7.4 | 11.8 | 120 | 80 | 1.5 | 51 | 0.02 |
| 32 | 32 | 7.4 | 11.8 | 135 | 90 | 1.5 | 53 | 0.02 |
| 33 | 33 | 7.4 | 11.8 | 95 | 31 | 3.1 | 40 | 0.02 |
| 34 | 34 | 7.4 | 11.8 | 150 | 41 | 3.7 | 69 | 0.80 |
| 35 | 35 | 7.4 | 11.8 | 110 | 32 | 3.4 | 47 | 0.02 |
| 36 | 36 | 7.4 | 11.8 | 110 | 34 | 3.2 | 49 | 0.02 |
| 37 | 37 | 7.4 | 11.8 | 110 | 35 | 3.1 | 47 | 0.02 |
| 38 | 38 | 7.4 | 11.8 | 160 | 50 | 3.2 | 58 | 1.00 |
| 39 | 39 | 7.4 | 11.8 | 190 | 58 | 3.3 | 60 | 5.00 |
| C.E 1 | 40 | 7.4 | 11.8 | 110 | 33 | 3.3 | 48 | 0.02 |
| C.E 2 | 41 | 7.4 | 11.8 | 110 | 34 | 3.2 | 50 | 0.02 |
| C.E 3 | 42 | 0.0 | 5.6 | 110 | 32 | 3.4 | 51 | 0.02 |
| C.E 4 | 43 | 0.0 | 7.2 | 55 | 38 | 1.4 | 49 | 0.00 |
| C.E 5 | 44 | 0.0 | 7.2 | 0 | 0 | — | 0 | 0.00 |
| C.E 6 | 45 | 4.0 | 12.0 | 0 | 0 | — | 0 | 0.00 |
| C.E 7 | 46 | 0.0 | 5.4 | 75 | 20 | 3.8 | 56 | 0.00 |
| C.E 8 | 47 | 4.0 | 30.0 | 0 | 0 | — | 0 | 0.00 |

In the tables Table 5-1 and Table 5-2, "C.E." indicates "Comparative example". "Amount of M2" indicates the content ratio of the monomer unit M2 in the resin A. "Mw of resin A" is the weight-average molecular weight Mw of the THF-soluble matter determined by GPC. "Mp" is the molecular weight of the main peak in the molecular weight distribution chart obtained when the THF-soluble matter of the toner is measured by GPC. "Amount of resin B" indicates the content ratio (% by mass) of resin B in the toner. "L" indicates the content ratio (% by mass) of the component having a weight-average molecular weight of from 2000 to 5000 and contained in the tetrahydrofuran-soluble matter of the toner.

Also, "Coverage ratio" is the coverage ratio (area %) of the toner particle surface with the organosilicon polymer. "Formula (4)" indicates the content ratio of the structure represented by formula (4) based on the mass of the tetrahydrofuran-soluble matter in the toner.

The evaluation methods and evaluation criteria for the toners are described below.

Evaluation of Fixing Performance

An electrophotographic apparatus for evaluation obtained by modifying HP Color Laser jet Enterprise M653dn to set the process speed to 330 mm/s and also modifying so that the fixing nip pressure was 80% of the default setting was used as the evaluation machine. Also, the toner was removed from the cyan cartridge, and 100 g of evaluation toner was filled instead.

On LETTER size XEROX 4200 paper (manufactured by Xerox Corp., 75 g/$m^2$), an unfixed toner image of 2.0 cm long×15.0 cm wide (toner laid-on level: 0.8 mg/$cm^2$) was formed in a portion 1.0 cm from the upper edge in the paper passing direction.

The set temperature was gradually increased by 5° C. from the initial fixing temperature to 150° C. under normal temperature and normal humidity environment (23° C., 60% RH), and the unfixed images were fixed at each temperature. The low-temperature fixability of the obtained fixed images was evaluated according to the following criteria by considering the fixing temperature at which cold offset did not occur as the minimum fixing temperature. When the evaluation was A to C, it was determined to be good.

Evaluation Criteria

A: Minimum fixing temperature is 165° C. or less

B: Minimum fixing temperature is higher than 165° C. and 170° C. or lower

C: Minimum fixing temperature is higher than 170° C. and 175° C. or lower

D: Minimum fixing temperature is higher than 175° C.

Evaluation of Hot-Offset Resistance

The electrophotographic apparatus for evaluation that was modified in the same manner as in the above-described evaluation of fixing performance was used as the evaluation machine. Office 70 manufactured by Canon Inc. (basis weight: 70 g/$m^2$) was used as the evaluation paper, and an image with an area of 2 cm×2 cm was output (toner laid-on level: 0.8 mg/$cm^2$). While changing the fixing temperature control, the fixing temperature at the time when hot offset occurred at the trailing end of the evaluation paper in the paper passing direction when passing through the fixing device was confirmed and the evaluation was performed based on the following evaluation criteria.

A: Hot offset occurrence temperature is 200° C. or more

B: Hot offset occurrence temperature is 190° C. or more and less than 200° C.

C: Hot offset occurrence temperature is 180° C. or more and less than 190° C.

D: Hot offset occurrence temperature is less than 180° C.

Evaluation of Streak Image Under High-Temperature and High-Humidity Environment

For the evaluation, a modified LBP712Ci (manufactured by Canon Inc.) was used as the evaluation machine. The process speed of the main body was modified to 270 mm/sec. Necessary adjustments were made so that image formation could be performed under these conditions. For the evaluation, the toner was removed from the cyan cartridge, and 100 g of evaluation toner was filled instead.

Evaluation of image streaks caused by fusion or adhesion of toner to the toner layer thickness control member was performed in a high-temperature and high-humidity environment (30° C./80% RH). In a high-temperature and high-humidity environment (30° C./80% RH), 15000 sheets were printed in an intermittent/continuous use mode in which two sheets with an image of letter E were output every 4 sec so that the print percentage was 0.5%. After that, a full-surface halftone image was output on XEROX 4200 paper (75 g/$m^2$, manufactured by Xerox Corp.), and the presence or absence of streaks was observed. C or more was determined to be good.

(Evaluation Criteria)

A: No streaks or toner lumps occurred

B: There are no spotty streaks, but there are 1 to 3 small toner lumps

C: Slight spotty streaks at edges, or 4 or 5 small toner lumps

D: There are spotty streaks on the entire surface, or there are 5 or more small toner lumps or obvious toner lumps Evaluation of Blocking (Storability)

A total of 5 g of each toner was placed in a respective 50 mL resin cup and allowed to stand in a thermostat set at a temperature of 50° C. and a humidity of 10% RH for 72 h, and the presence or absence of aggregates was examined and evaluated according to the following criteria. C or more was determined to be good.

(Evaluation Criteria)

A: When the cup is tilted, the toner flows

B: The toner does not flow even when the cup is tilted, but the toner flows when an impact is applied C: Part of the toner does not flow even when the cup is impacted, but the toner that does not flow can be easily loosened by pressing with a finger D: Toner that does not flow is present and this toner not easily loosened by pressing with a finger but is loosened by pressing strongly Evaluation of Contamination of the Member For the evaluation, a modified LBP712Ci (manufactured by Canon Inc.) was used as the evaluation machine. The process speed of the main body was modified to 270 mm/sec. Necessary adjustments were made so that image formation could be performed under these conditions. In the evaluation, the toner was removed from the cyan cartridge, 100 g of the evaluation toner was filled instead, and 15000 sheets were printed in an intermittent/continuous use mode in which two sheets with an image of letter E were output every 4 sec so that the print percentage was 0.5%.

A drum unit (unused one) for image checking was prepared. Next, the charging roller for toner evaluation that was used in the intermittent/continuous use mode was attached to the drum unit for image checking, and image output was performed. An image was produced in which a halftone was printed on the entire surface. The densities at 30 mm left and right margins and the central portion of the halftone image formed from the durability image were measured, and evaluation was performed from the difference in density between the margins and the central portion.

It is known that when the charging member is contaminated, uneven charging occurs on the photosensitive member, resulting in uneven density of the halftone image (HT).

Further, the density was measured with an X-Rite color reflection densitometer (X-Rite 500 Series, manufactured by X-Rite, Inc.). C or more was determined to be good.

(Evaluation Criteria)

A: Halftone density difference after outputting 15000 sheets is less than 0.030

B: Halftone density difference after outputting 15000 sheets is 0.030 or more and less than 0.050

C: Halftone density difference after outputting 15000 sheets is 0.050 or more and less than 0.100

D: Halftone density difference after outputting 15000 sheets is 0.100 or more

TABLE 6

| | Evaluation | Fixing performance | | | | | Evaluation of member contamination | |
|---|---|---|---|---|---|---|---|---|
| Example No. | toner No. | Fixing temperature | Rank | Hot-offset resistance | Development streaks | Storability | HT density unevenness | Rank |
| 1 | 1 | 165° C. | A | A | A | A | 0.011 | A |
| 2 | 2 | 165° C. | A | A | A | A | 0.012 | A |
| 3 | 3 | 165° C. | A | B | B | B | 0.011 | A |
| 4 | 4 | 170° C. | B | A | A | B | 0.013 | A |
| 5 | 5 | 165° C. | A | A | A | A | 0.012 | A |
| 6 | 6 | 165° C. | A | B | B | A | 0.011 | A |

TABLE 6-continued

| | Evaluation | Fixing performance | | | | | Evaluation of member contamination | |
|---|---|---|---|---|---|---|---|---|
| Example No. | toner No. | Fixing temperature | Rank | Hot-offset resistance | Development streaks | Storability | HT density unevenness | Rank |
| 7 | 7 | 165° C. | A | B | A | A | 0.012 | A |
| 8 | 8 | 170° C. | B | A | A | A | 0.012 | A |
| 9 | 9 | 165° C. | A | B | B | B | 0.013 | A |
| 10 | 10 | 165° C. | A | C | C | C | 0.013 | A |
| 11 | 11 | 165° C. | A | A | B | B | 0.011 | A |
| 12 | 12 | 165° C. | A | A | A | A | 0.012 | A |
| 13 | 13 | 175° C. | C | A | A | A | 0.012 | A |
| 14 | 14 | 165° C. | A | A | A | A | 0.013 | A |
| 15 | 15 | 165° C. | A | A | A | A | 0.011 | A |
| 16 | 16 | 165° C. | A | B | B | B | 0.012 | A |
| 17 | 17 | 165° C. | A | B | A | A | 0.013 | A |
| 18 | 18 | 175° C. | C | A | A | A | 0.013 | A |
| 19 | 19 | 170° C. | B | A | A | A | 0.013 | A |
| 20 | 20 | 170° C. | B | A | A | A | 0.011 | A |
| 21 | 21 | 165° C. | A | A | B | B | 0.012 | A |
| 22 | 22 | 170° C. | B | B | B | B | 0.013 | A |
| 23 | 23 | 165° C. | A | C | C | C | 0.014 | A |
| 24 | 24 | 165° C. | A | C | C | C | 0.013 | A |
| 25 | 25 | 175° C. | C | A | B | A | 0.012 | A |
| 26 | 26 | 175° C. | C | A | A | A | 0.070 | C |
| 27 | 27 | 170° C. | B | A | A | A | 0.034 | B |
| 28 | 28 | 165° C. | A | A | A | A | 0.011 | A |
| 29 | 29 | 175° C. | C | A | A | A | 0.070 | C |
| 30 | 30 | 170° C. | B | A | A | A | 0.012 | A |
| 31 | 31 | 165° C. | A | A | B | A | 0.040 | B |
| 32 | 32 | 170° C. | B | A | C | A | 0.080 | C |
| 33 | 33 | 165° C. | A | B | B | B | 0.032 | B |
| 34 | 34 | 175° C. | C | A | A | A | 0.012 | A |
| 35 | 35 | 165° C. | A | A | A | A | 0.011 | A |
| 36 | 36 | 165° C. | A | A | A | A | 0.013 | A |
| 37 | 37 | 165° C. | A | A | A | A | 0.012 | A |
| 38 | 38 | 170° C. | B | A | A | A | 0.012 | A |
| 39 | 39 | 175° C. | C | A | A | A | 0.014 | A |
| C.E 1 | 40 | 180° C. | D | A | A | A | 0.012 | A |
| C.E 2 | 41 | 180° C. | D | A | A | A | 0.011 | A |
| C.E 3 | 42 | 180° C. | D | A | A | A | 0.013 | A |
| C.E 4 | 43 | 180° C. | D | A | A | A | 0.070 | C |
| C.E 5 | 44 | 180° C. | D | A | B | B | 0.075 | C |
| C.E 6 | 45 | 180° C. | D | A | B | A | 0.076 | C |
| C.E 7 | 46 | 190° C. | D | A | A | A | 0.101 | D |
| C.E 8 | 47 | Not fixed | D | Not fixed | D | D | 0.074 | C |

In the table 6, "C.E." indicates "Comparative example".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-113884, filed Jul. 15, 2022, which is hereby incorporated by reference herein in its entirety.

What is claimed is:

1. A toner, comprising:

a toner particle comprising a binder resin and wax;

a surface of the toner particle comprises protrusions made of an organosilicon polymer, the organosilicon polymer having a structure represented by R—$SiO_{3/2}$ when R represents an alkyl group having 1 to 6 carbon atoms or a phenyl group; and when observing a cross section of the toner with a scanning transmission electron microscope, W is 80 to 250 nm and His 25 to 100 nm where W is a number-average value of a width of the protrusions and His an average height of the protrusions measured by a scanning probe microscope, wherein X30 is 25 to 300, and X45 is 400 to 1000 when X30 denotes slope X measured at 30° C. and X45 denotes slope X measured at 45° C. where slope X is a straight line obtained by performing a micro-compression test on one particle of the toner, obtaining a relationship of a deformation amount (μm) with respect to a load (mN), calculating a percentage deformation (%), which is a ratio of the deformation amount to a particle diameter of the particle that was measured, plotting a load (mN)-percentage deformation (%) plot, and then using all the points plotted within the range in which the percentage deformation was 15% or less of the particle diameter of the particle that was measured for approximation by a least squares method.

2. The toner according to claim 1, wherein the wax comprises an ester wax.

3. The toner according to claim 2, wherein the ester wax comprises an ester compound of an aliphatic diol having 2 to 6 carbon atoms and an aliphatic monocarboxylic acid having 14 to 22 carbon atoms.

4. The toner according to claim 2, wherein the binder resin comprises a resin A having a monomer unit M1, and

|SP (M1)−SP (W)| is 1.00 or less where SP (M1) is an SP value $(J/cm^3)^{0.5}$ of monomer unit M1 in a Fedors method, and SP (W) is an SP value $(J/cm^3)^{0.5}$ of the ester wax.

5. The toner according to claim 2, wherein the binder resin comprises a resin A and a resin B, resin A is a styrene acrylic copolymer having a monomer unit M1 represented by formula (1) and a monomer unit M2 represented by formula (2), a content ratio of monomer unit M2 in resin A being 45.0 to 85.0% by mass

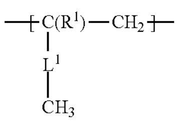

(1)

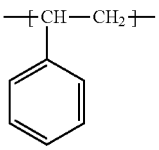

(2)

where $L^1$ represents $—COO(CH_2)_n—$, n is an integer of 11 to 31, the carbonyl of $L^1$ is bonded to a carbon atom of the main chain, and $R^1$ represents a hydrogen atom or a methyl group, resin B has monomer unit M2 represented by formula (2), a content ratio of monomer unit M2 in resin B being 90.0 to 100.0% by mass, $|SP(M1)-SP(W)|$ is 1.00 or less where SP (M1) is an SP value $(J/cm^3)^{0.5}$ of the monomer unit M1 in a Fedors method and SP (W) is an SP value $(J/cm^3)^{0.5}$ of the ester wax, a weight-average molecular weight Mw of a tetrahydrofuran-soluble matter of resin A determined by gel permeation chromatography is 100000 to 450000, a weight-average molecular weight Mw of a tetrahydrofuran-soluble matter of resin B determined by gel permeation chromatography is 2000 to 5000, and a content ratio of resin B in the toner is 3.0 to 12.0% by mass.

6. The toner according to claim 1, wherein a main peak is present in a molecular weight range of 10000 to 300000 in a molecular weight distribution chart obtained by measuring a tetrahydrofuran-soluble matter of the toner by gel permeation chromatography, and a content ratio of a component having a weight-average molecular weight of 2000 to 5000 contained in the tetrahydrofuran-soluble matter of the toner is 8.0 to 15.0% by mass based on the mass of the toner.

7. The toner according to claim 1, wherein W/H is 1.5 to 3.7.

8. The toner according to claim 1, wherein a coverage ratio of the toner particle surface with the organosilicon polymer is 35 to 60% by area.

9. The toner according to claim 1, wherein a tetrahydrofuran-soluble matter of the toner includes a structure represented by formula (4)

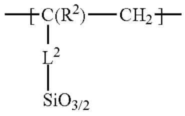

(4)

where $L^2$ represents $—COO(CH_2)_n—$, n is an integer of from 1 to 10, the carbonyl of $L^2$ is bonded to a carbon atom of the main chain, and $R^2$ represents a hydrogen atom or a methyl group, and a content ratio of the structure represented by formula (4) is 0.01 to 1.00% by mass based on the mass of the tetrahydrofuran-soluble matter of the toner.

* * * * *